US012623691B2

(12) United States Patent
Balakrishnan et al.

(10) Patent No.: US 12,623,691 B2
(45) Date of Patent: May 12, 2026

(54) FAIL-SAFE CORRECTIVE ACTIONS BASED ON VISION INFORMATION FOR AUTONOMOUS VEHICLES

(71) Applicant: Tesla, Inc., Austin, TX (US)

(72) Inventors: Uma Balakrishnan, Austin, TX (US); Daniel Hunter, Austin, TX (US); Akash Chaurasia, Austin, TX (US); Yun-Ta Tsai, Austin, TX (US); Akshay Vijay Phatak, Austin, TX (US)

(73) Assignee: Tesla, Inc., Austin, TX (US)

( * ) Notice: Subject to any disclaimer, the term of this patent is extended or adjusted under 35 U.S.C. 154(b) by 44 days.

(21) Appl. No.: 18/320,717

(22) Filed: May 19, 2023

(65) Prior Publication Data

US 2023/0406356 A1     Dec. 21, 2023

Related U.S. Application Data

(60) Provisional application No. 63/365,050, filed on May 20, 2022, provisional application No. 63/365,078, filed on May 20, 2022.

(51) Int. Cl.
*B60W 60/00* (2020.01)
*G06V 20/56* (2022.01)

(52) U.S. Cl.
CPC ....... *B60W 60/00182* (2020.02); *G06V 20/56* (2022.01); *B60W 2420/403* (2013.01); *B60W 2555/20* (2020.02)

(58) Field of Classification Search
CPC ....... B60W 60/00182; B60W 2555/20; B60W 2420/403; G06V 20/56
See application file for complete search history.

(56) References Cited

U.S. PATENT DOCUMENTS 6,882,755 B2   4/2005   Silverstein et al.
7,209,031 B2   4/2007   Nakai et al.
7,391,907 B1   6/2008   Venetianer et al.
7,747,070 B2   6/2010   Puri
             (Continued)

FOREIGN PATENT DOCUMENTS

AU      2019261735 A1    6/2020
AU      2019201716 A1   10/2020
             (Continued)

OTHER PUBLICATIONS

Chen et al., "Simultaneous End-to-End Vehicle and License Plate Detection With Multi-Branch Attention Neural Network," 2020, IEEE Transactions on Intelligent Transportation Systems, vol. 21, Issue 9, 10 Pages.
             (Continued)

*Primary Examiner* — Steven Vu Nguyen

(74) *Attorney, Agent, or Firm* — Foley & Lardner LLP

(57) ABSTRACT

Systems and methods for fail-safe corrective actions based on vision information for autonomous driving. An example method is implemented by a processor system included in a vehicle, with the method comprising obtaining images from image sensors positioned about the vehicle. Visibility information is determined for at least a portion of the images. Adjustment of operation of an autonomous vehicle is caused based on the visibility information.

19 Claims, 11 Drawing Sheets

(56) References Cited

U.S. PATENT DOCUMENTS

| | | | |
|---|---|---|---|
| 7,904,867 | B2 | 3/2011 | Burch et al. |
| 7,974,492 | B2 | 7/2011 | Nishijima |
| 8,165,380 | B2 | 4/2012 | Choi et al. |
| 8,369,633 | B2 | 2/2013 | Lu et al. |
| 8,406,515 | B2 | 3/2013 | Cheatle et al. |
| 8,509,478 | B2 | 8/2013 | Haas et al. |
| 8,588,470 | B2 | 11/2013 | Rodriguez et al. |
| 8,744,174 | B2 | 6/2014 | Hamada et al. |
| 8,773,498 | B2 | 7/2014 | Lindbergh |
| 8,874,266 | B1 | 10/2014 | Francis et al. |
| 8,912,476 | B2 | 12/2014 | Fogg et al. |
| 8,913,830 | B2 | 12/2014 | Sun et al. |
| 8,928,753 | B2 | 1/2015 | Han et al. |
| 8,972,095 | B2 | 3/2015 | Furuno et al. |
| 8,976,269 | B2 | 3/2015 | Duong |
| 9,008,422 | B2 | 4/2015 | Eid et al. |
| 9,081,385 | B1 | 7/2015 | Ferguson et al. |
| 9,275,289 | B2 | 3/2016 | Li et al. |
| 9,586,455 | B2 | 3/2017 | Sugai et al. |
| 9,606,539 | B1 | 3/2017 | Kentley et al. |
| 9,632,502 | B1 | 4/2017 | Levinson et al. |
| 9,672,437 | B2 | 6/2017 | McCarthy |
| 9,710,696 | B2 | 7/2017 | Wang et al. |
| 9,738,223 | B2 | 8/2017 | Zhang et al. |
| 9,754,154 | B2 | 9/2017 | Craig et al. |
| 9,767,369 | B2 | 9/2017 | Furman et al. |
| 9,965,865 | B1 | 5/2018 | Agrawal et al. |
| 10,031,526 | B1 | 7/2018 | Li et al. |
| 10,133,273 | B2 | 11/2018 | Linke |
| 10,140,252 | B2 | 11/2018 | Fowers et al. |
| 10,140,544 | B1 | 11/2018 | Zhao et al. |
| 10,146,225 | B2 | 12/2018 | Ryan |
| 10,152,655 | B2 | 12/2018 | Krishnamurthy et al. |
| 10,167,800 | B1 | 1/2019 | Chung et al. |
| 10,169,680 | B1 | 1/2019 | Sachdeva et al. |
| 10,192,016 | B2 | 1/2019 | Ng et al. |
| 10,216,189 | B1 | 2/2019 | Haynes |
| 10,228,693 | B2 | 3/2019 | Micks et al. |
| 10,242,293 | B2 | 3/2019 | Shim et al. |
| 10,248,121 | B2 | 4/2019 | VandenBerg, III |
| 10,262,218 | B2 | 4/2019 | Lee et al. |
| 10,282,623 | B1 | 5/2019 | Ziyaee et al. |
| 10,296,828 | B2 | 5/2019 | Viswanathan |
| 10,303,961 | B1 | 5/2019 | Stoffel et al. |
| 10,310,087 | B2 | 6/2019 | Laddha et al. |
| 10,311,312 | B2 | 6/2019 | Yu et al. |
| 10,318,848 | B2 | 6/2019 | Dijkman et al. |
| 10,325,178 | B1 | 6/2019 | Tang et al. |
| 10,331,974 | B2 | 6/2019 | Zia et al. |
| 10,338,600 | B2 | 7/2019 | Yoon et al. |
| 10,343,607 | B2 | 7/2019 | Kumon et al. |
| 10,359,783 | B2 | 7/2019 | Williams et al. |
| 10,366,290 | B2 | 7/2019 | Wang et al. |
| 10,372,130 | B1 | 8/2019 | Kaushansky et al. |
| 10,373,019 | B2 | 8/2019 | Nariyambut Murali et al. |
| 10,373,026 | B1 | 8/2019 | Kim et al. |
| 10,380,741 | B2 | 8/2019 | Yedla et al. |
| 10,394,237 | B2 | 8/2019 | Xu et al. |
| 10,395,144 | B2 | 8/2019 | Zeng et al. |
| 10,402,646 | B2 | 9/2019 | Klaus |
| 10,402,986 | B2 | 9/2019 | Ray et al. |
| 10,414,395 | B1 | 9/2019 | Sapp et al. |
| 10,423,934 | B1 | 9/2019 | Zanghi et al. |
| 10,436,615 | B2 | 10/2019 | Agarwal et al. |
| 10,452,905 | B2 | 10/2019 | Segalovitz et al. |
| 10,460,053 | B2 | 10/2019 | Olson et al. |
| 10,467,459 | B2 | 11/2019 | Chen et al. |
| 10,468,008 | B2 | 11/2019 | Beckman et al. |
| 10,468,062 | B1 | 11/2019 | Levinson et al. |
| 10,470,510 | B1 | 11/2019 | Koh et al. |
| 10,474,160 | B2 | 11/2019 | Huang et al. |
| 10,474,161 | B2 | 11/2019 | Huang et al. |
| 10,474,928 | B2 | 11/2019 | Sivakumar et al. |
| 10,489,126 | B2 | 11/2019 | Kumar et al. |
| 10,489,972 | B2 | 11/2019 | Atsmon |
| 10,497,264 | B2 | 12/2019 | Rowell |
| 10,503,971 | B1 | 12/2019 | Dang et al. |
| 10,514,711 | B2 | 12/2019 | Bar-Nahum et al. |
| 10,528,824 | B2 | 1/2020 | Zou |
| 10,529,078 | B2 | 1/2020 | Abreu et al. |
| 10,529,088 | B2 | 1/2020 | Fine et al. |
| 10,534,854 | B2 | 1/2020 | Sharma et al. |
| 10,535,191 | B2 | 1/2020 | Sachdeva et al. |
| 10,542,930 | B1 | 1/2020 | Sanchez et al. |
| 10,546,197 | B2 | 1/2020 | Shrestha et al. |
| 10,546,217 | B2 | 1/2020 | Albright et al. |
| 10,552,682 | B2 | 2/2020 | Jonsson et al. |
| 10,559,386 | B1 | 2/2020 | Neuman |
| 10,565,475 | B2 | 2/2020 | Lecue et al. |
| 10,567,674 | B2 | 2/2020 | Kirsch |
| 10,568,570 | B1 | 2/2020 | Sherpa et al. |
| 10,572,717 | B1 | 2/2020 | Zhu et al. |
| 10,574,905 | B2 | 2/2020 | Srikanth et al. |
| 10,579,058 | B2 | 3/2020 | Oh et al. |
| 10,579,063 | B2 | 3/2020 | Haynes et al. |
| 10,579,897 | B2 | 3/2020 | Redmon et al. |
| 10,586,280 | B2 | 3/2020 | McKenna et al. |
| 10,591,914 | B2 | 3/2020 | Palanisamy et al. |
| 10,592,785 | B2 | 3/2020 | Zhu et al. |
| 10,599,701 | B2 | 3/2020 | Liu |
| 10,599,930 | B2 | 3/2020 | Lee et al. |
| 10,599,958 | B2 | 3/2020 | He et al. |
| 10,606,990 | B2 | 3/2020 | Tuli et al. |
| 10,609,434 | B2 | 3/2020 | Singhai et al. |
| 10,614,344 | B2 | 4/2020 | Anthony et al. |
| 10,621,513 | B2 | 4/2020 | Deshpande et al. |
| 10,627,818 | B2 | 4/2020 | Sapp et al. |
| 10,628,432 | B2 | 4/2020 | Guo et al. |
| 10,628,686 | B2 | 4/2020 | Ogale et al. |
| 10,628,688 | B1 | 4/2020 | Kim et al. |
| 10,629,080 | B2 | 4/2020 | Kazemi et al. |
| 10,636,161 | B2 | 4/2020 | Uchigaito |
| 10,636,169 | B2 | 4/2020 | Estrada et al. |
| 10,642,275 | B2 | 5/2020 | Silva et al. |
| 10,643,320 | B2 | 5/2020 | Lee et al. |
| 10,645,344 | B2 | 5/2020 | Marman et al. |
| 10,649,464 | B2 | 5/2020 | Gray |
| 10,650,071 | B2 | 5/2020 | Asgekar et al. |
| 10,652,565 | B1 | 5/2020 | Zhang et al. |
| 10,656,657 | B2 | 5/2020 | Djuric et al. |
| 10,657,391 | B2 | 5/2020 | Chen et al. |
| 10,657,418 | B2 | 5/2020 | Marder et al. |
| 10,657,934 | B1 | 5/2020 | Kolen et al. |
| 10,661,902 | B1 | 5/2020 | Tavshikar |
| 10,664,750 | B2 | 5/2020 | Greene |
| 10,671,082 | B2 | 6/2020 | Huang et al. |
| 10,671,886 | B2 | 6/2020 | Price et al. |
| 10,678,244 | B2 | 6/2020 | Landola et al. |
| 10,678,839 | B2 | 6/2020 | Gordon et al. |
| 10,678,997 | B2 | 6/2020 | Ahuja et al. |
| 10,679,129 | B2 | 6/2020 | Baker |
| 10,684,626 | B1 | 6/2020 | Martin |
| 10,685,159 | B2 | 6/2020 | Su et al. |
| 10,685,188 | B1 | 6/2020 | Zhang et al. |
| 10,692,000 | B2 | 6/2020 | Surazhsky et al. |
| 10,692,242 | B1 | 6/2020 | Morrison et al. |
| 10,693,740 | B2 | 6/2020 | Coccia et al. |
| 10,698,868 | B2 | 6/2020 | Guggilla et al. |
| 10,699,119 | B2 | 6/2020 | Lo et al. |
| 10,699,140 | B2 | 6/2020 | Kench et al. |
| 10,699,477 | B2 | 6/2020 | Levinson et al. |
| 10,713,502 | B2 | 7/2020 | Tiziani |
| 10,719,759 | B2 | 7/2020 | Kutliroff |
| 10,725,475 | B2 | 7/2020 | Yang et al. |
| 10,726,264 | B2 | 7/2020 | Sawhney et al. |
| 10,726,279 | B1 | 7/2020 | Kim et al. |
| 10,726,374 | B1 | 7/2020 | Engineer et al. |
| 10,732,261 | B1 | 8/2020 | Wang et al. |
| 10,733,262 | B2 | 8/2020 | Miller et al. |
| 10,733,482 | B1 | 8/2020 | Lee et al. |
| 10,733,506 | B1 | 8/2020 | Ogale et al. |
| 10,733,638 | B1 | 8/2020 | Jain et al. |
| 10,733,755 | B2 | 8/2020 | Liao et al. |
| 10,733,876 | B2 | 8/2020 | Moura et al. |

(56) References Cited

U.S. PATENT DOCUMENTS

| | | | |
|---|---|---|---|
| 10,740,563 B2 | 8/2020 | Dugan | |
| 10,740,694 B2 | 8/2020 | Harvill et al. | |
| 10,740,914 B2 | 8/2020 | Xiao et al. | |
| 10,748,062 B2 | 8/2020 | Rippel et al. | |
| 10,748,247 B2 | 8/2020 | Paluri | |
| 10,751,879 B2 | 8/2020 | Li et al. | |
| 10,755,112 B2 | 8/2020 | Mabuchi | |
| 10,755,575 B2 | 8/2020 | Johnston et al. | |
| 10,757,330 B2 | 8/2020 | Ashrafi | |
| 10,762,396 B2 | 9/2020 | Vallespi et al. | |
| 10,768,628 B2 | 9/2020 | Martin et al. | |
| 10,768,629 B2 | 9/2020 | Song et al. | |
| 10,769,446 B2 | 9/2020 | Chang et al. | |
| 10,769,483 B2 | 9/2020 | Nirenberg et al. | |
| 10,769,493 B2 | 9/2020 | Yu et al. | |
| 10,769,494 B2 | 9/2020 | Xiao et al. | |
| 10,769,525 B2 | 9/2020 | Redding et al. | |
| 10,776,626 B1 | 9/2020 | Lin et al. | |
| 10,776,673 B2 | 9/2020 | Kim et al. | |
| 10,776,939 B2 | 9/2020 | Ma et al. | |
| 10,779,760 B2 | 9/2020 | Lee et al. | |
| 10,783,381 B2 | 9/2020 | Yu et al. | |
| 10,783,454 B2 | 9/2020 | Shoaib et al. | |
| 10,789,402 B1 | 9/2020 | Vemuri et al. | |
| 10,789,544 B2 | 9/2020 | Fiedel et al. | |
| 10,790,919 B1 | 9/2020 | Kolen et al. | |
| 10,796,221 B2 | 10/2020 | Zhang et al. | |
| 10,796,355 B1 | 10/2020 | Price et al. | |
| 10,796,423 B2 | 10/2020 | Goja | |
| 10,798,368 B2 | 10/2020 | Briggs et al. | |
| 10,803,325 B2 | 10/2020 | Bai et al. | |
| 10,803,328 B1 | 10/2020 | Bai et al. | |
| 10,803,743 B2 | 10/2020 | Abari et al. | |
| 10,805,629 B2 | 10/2020 | Liu et al. | |
| 10,809,730 B2 | 10/2020 | Chintakindi | |
| 10,810,445 B1 | 10/2020 | Kangaspunta | |
| 10,816,346 B2 | 10/2020 | Wheeler et al. | |
| 10,816,992 B2 | 10/2020 | Chen | |
| 10,817,731 B2 | 10/2020 | Vallespi et al. | |
| 10,817,732 B2 | 10/2020 | Porter et al. | |
| 10,819,923 B1 | 10/2020 | McCauley et al. | |
| 10,824,122 B2 | 11/2020 | Mummadi et al. | |
| 10,824,862 B2 | 11/2020 | Qi et al. | |
| 10,828,790 B2 | 11/2020 | Nemallan | |
| 10,832,057 B2 | 11/2020 | Chan et al. | |
| 10,832,093 B1 | 11/2020 | Taralova et al. | |
| 10,832,414 B2 | 11/2020 | Pfeiffer | |
| 10,832,418 B1 | 11/2020 | Karasev et al. | |
| 10,833,785 B1 | 11/2020 | O'Shea et al. | |
| 10,836,379 B2 | 11/2020 | Xiao et al. | |
| 10,838,936 B2 | 11/2020 | Cohen | |
| 10,839,230 B2 | 11/2020 | Charette et al. | |
| 10,839,578 B2 | 11/2020 | Coppersmith et al. | |
| 10,843,628 B2 | 11/2020 | Kawamoto et al. | |
| 10,845,820 B2 | 11/2020 | Wheeler | |
| 10,845,943 B1 | 11/2020 | Ansari et al. | |
| 10,846,831 B2 | 11/2020 | Raduta | |
| 10,846,888 B2 | 11/2020 | Kaplanyan et al. | |
| 10,853,670 B2 | 12/2020 | Sholingar et al. | |
| 10,853,739 B2 | 12/2020 | Truong et al. | |
| 10,860,919 B2 | 12/2020 | Kanazawa et al. | |
| 10,860,924 B2 | 12/2020 | Burger | |
| 10,867,444 B2 | 12/2020 | Russell et al. | |
| 10,871,444 B2 | 12/2020 | Al et al. | |
| 10,871,782 B2 | 12/2020 | Milstein et al. | |
| 10,872,204 B2 | 12/2020 | Zhu et al. | |
| 10,872,254 B2 | 12/2020 | Mangla et al. | |
| 10,872,326 B2 | 12/2020 | Garner | |
| 10,872,531 B2 | 12/2020 | Liu et al. | |
| 10,885,083 B2 | 1/2021 | Moeller-Bertram et al. | |
| 10,887,433 B2 | 1/2021 | Fu et al. | |
| 10,890,898 B2 | 1/2021 | Akella et al. | |
| 10,891,715 B2 | 1/2021 | Li | |
| 10,891,735 B2 | 1/2021 | Yang et al. | |
| 10,893,070 B2 | 1/2021 | Wang et al. | |
| 10,893,107 B1 | 1/2021 | Callari et al. | |
| 10,896,763 B2 | 1/2021 | Kempanna et al. | |
| 10,901,416 B2 | 1/2021 | Khanna et al. | |
| 10,901,508 B2 | 1/2021 | Laszlo et al. | |
| 10,902,551 B1 | 1/2021 | Mellado et al. | |
| 10,908,068 B2 | 2/2021 | Amer et al. | |
| 10,908,606 B2 | 2/2021 | Stein et al. | |
| 10,909,368 B2 | 2/2021 | Guo et al. | |
| 10,909,453 B1 | 2/2021 | Myers et al. | |
| 10,915,783 B1 | 2/2021 | Hallman et al. | |
| 10,917,522 B2 | 2/2021 | Segalis et al. | |
| 10,921,817 B1 | 2/2021 | Kangaspunta | |
| 10,922,578 B2 | 2/2021 | Banerjee et al. | |
| 10,924,661 B2 | 2/2021 | Vasconcelos et al. | |
| 10,928,508 B2 | 2/2021 | Swaminathan | |
| 10,929,757 B2 | 2/2021 | Baker et al. | |
| 10,930,065 B2 | 2/2021 | Grant et al. | |
| 10,936,908 B1 | 3/2021 | Ho et al. | |
| 10,937,186 B2 | 3/2021 | Wang et al. | |
| 10,943,101 B2 | 3/2021 | Agarwal et al. | |
| 10,943,132 B2 | 3/2021 | Wang et al. | |
| 10,943,355 B2 | 3/2021 | Fagg et al. | |
| 10,990,826 B1 | 4/2021 | Haider et al. | |
| 11,126,180 B1 | 9/2021 | Kobilarov | |
| 11,157,287 B2 | 10/2021 | Talpes et al. | |
| 11,157,441 B2 | 10/2021 | Talpes et al. | |
| 11,256,958 B1 | 2/2022 | Subbiah et al. | |
| 11,282,235 B2 | 3/2022 | Torikura et al. | |
| 11,292,462 B1 | 4/2022 | Karasev et al. | |
| 11,295,180 B1 | 4/2022 | Tolstov et al. | |
| 11,409,692 B2 | 8/2022 | Das Sarma et al. | |
| 11,430,177 B1 | 8/2022 | Lasram et al. | |
| 11,447,142 B1 | 9/2022 | Engstrom et al. | |
| 11,501,572 B2 | 11/2022 | Naphade et al. | |
| 11,615,223 B2 | 3/2023 | Taralova | |
| 11,625,041 B2 | 4/2023 | Das et al. | |
| 11,921,824 B1 | 3/2024 | Hester et al. | |
| 2003/0035481 A1 | 2/2003 | Hahm | |
| 2005/0162445 A1 | 7/2005 | Sheasby et al. | |
| 2006/0072847 A1 | 4/2006 | Chor et al. | |
| 2006/0098843 A1 | 5/2006 | Chew | |
| 2006/0224533 A1 | 10/2006 | Thaler | |
| 2006/0280364 A1 | 12/2006 | Ma et al. | |
| 2009/0016571 A1 | 1/2009 | Tijerina et al. | |
| 2010/0118157 A1 | 5/2010 | Kameyama | |
| 2010/0121576 A1 | 5/2010 | Aso et al. | |
| 2012/0109915 A1 | 5/2012 | Kamekawa et al. | |
| 2012/0110491 A1 | 5/2012 | Cheung | |
| 2012/0134595 A1 | 5/2012 | Fonseca et al. | |
| 2013/0173150 A1 | 7/2013 | Ghisio | |
| 2013/0342692 A1* | 12/2013 | Li | H04N 7/18 |
| | | | 348/143 |
| 2014/0003709 A1 | 1/2014 | Ranganathan et al. | |
| 2014/0093176 A1 | 4/2014 | Maeda et al. | |
| 2014/0270362 A1 | 9/2014 | Najafi Shoushtari et al. | |
| 2015/0104102 A1 | 4/2015 | Carreira et al. | |
| 2016/0003636 A1 | 1/2016 | Ng-Thow-Hing et al. | |
| 2016/0132786 A1 | 5/2016 | Balan et al. | |
| 2016/0180197 A1 | 6/2016 | Kim et al. | |
| 2016/0307071 A1 | 10/2016 | Perronnin et al. | |
| 2016/0328856 A1 | 11/2016 | Mannino et al. | |
| 2017/0011281 A1 | 1/2017 | Dihkman et al. | |
| 2017/0060379 A1 | 3/2017 | Capozella et al. | |
| 2017/0132334 A1 | 5/2017 | Levinson et al. | |
| 2017/0158134 A1 | 6/2017 | Shigemura | |
| 2017/0206434 A1 | 7/2017 | Nariyambut et al. | |
| 2018/0012411 A1 | 1/2018 | Richey et al. | |
| 2018/0018590 A1 | 1/2018 | Szeto et al. | |
| 2018/0039853 A1 | 2/2018 | Liu et al. | |
| 2018/0052225 A1 | 2/2018 | Bã-hme et al. | |
| 2018/0067489 A1 | 3/2018 | Oder et al. | |
| 2018/0068459 A1 | 3/2018 | Zhang et al. | |
| 2018/0068540 A1 | 3/2018 | Romanenko et al. | |
| 2018/0074506 A1 | 3/2018 | Branson | |
| 2018/0121762 A1 | 5/2018 | Han et al. | |
| 2018/0150081 A1 | 5/2018 | Gross et al. | |
| 2018/0188027 A1 | 7/2018 | Zhang et al. | |
| 2018/0189578 A1 | 7/2018 | Yang et al. | |
| 2018/0203456 A1 | 7/2018 | Nagasaka et al. | |

(56) References Cited

U.S. PATENT DOCUMENTS

| | | |
|---|---|---|
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0348346 A1 | 12/2018 | Vallespi-Gonzalez et al. |
| 2018/0357492 A1 | 12/2018 | Allen et al. |
| 2018/0357511 A1 | 12/2018 | Misra et al. |
| 2018/0374105 A1 | 12/2018 | Azout et al. |
| 2019/0005338 A1 | 1/2019 | Watanabe |
| 2019/0023277 A1 | 1/2019 | Roger et al. |
| 2019/0025773 A1 | 1/2019 | Yang et al. |
| 2019/0026250 A1 | 1/2019 | Das Sarma et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0049970 A1 | 2/2019 | Djuric et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0096256 A1 | 3/2019 | Rowell |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0146519 A1 | 5/2019 | Miura et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0156485 A1 | 5/2019 | Pfeiffer |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0232955 A1 | 8/2019 | Grimm et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0251397 A1 | 8/2019 | Tremblay et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0271559 A1 | 9/2019 | Colgate et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0303759 A1 | 10/2019 | Farabet et al. |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0023836 A1 | 1/2020 | Schneider et al. |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0057487 A1 | 2/2020 | Sicconi et al. |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | England et al. |
| 2020/0074266 A1 | 3/2020 | Peake et al. |
| 2020/0086880 A1 | 3/2020 | Poeppel et al. |
| 2020/0089243 A1 | 3/2020 | Poeppel et al. |
| 2020/0089246 A1 | 3/2020 | Mcgill et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0118294 A1 | 4/2020 | Nakao et al. |
| 2020/0125112 A1 | 4/2020 | Mao et al. |
| 2020/0125844 A1 | 4/2020 | She et al. |
| 2020/0125845 A1 | 4/2020 | Hess et al. |

(56) References Cited

U.S. PATENT DOCUMENTS

| | | |
|---|---|---|
| 2020/0126129 A1 | 4/2020 | Lkhamsuren et al. |
| 2020/0126192 A1 | 4/2020 | Munkberg et al. |
| 2020/0134379 A1 | 4/2020 | Gaidon et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Uriasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210726 A1 | 7/2020 | Yang et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218910 A1 | 7/2020 | Herman |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242479 A1 | 7/2020 | Kim et al. |
| 2020/0242511 A1 | 7/2020 | Kale et al. |
| 2020/0245654 A1 | 8/2020 | Zhu et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0258380 A1 | 8/2020 | Wissing et al. |
| 2020/0265247 A1* | 8/2020 | Musk .................... G06V 20/58 |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0307578 A1* | 10/2020 | Magolan ............... B60W 10/20 |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0339109 A1 | 10/2020 | Hong et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361452 A1 | 11/2020 | Mcgill et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0394911 A1 | 12/2020 | Harmel et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |

(56) References Cited

U.S. PATENT DOCUMENTS

| | | |
|---|---|---|
| 2020/0402155 A1 | 12/2020 | Kurian et al. |
| 2020/0402226 A1 | 12/2020 | Peng |
| 2020/0409364 A1 | 12/2020 | Agrawal |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0031758 A1 | 2/2021 | Urano et al. |
| 2021/0031759 A1 | 2/2021 | Urano et al. |
| 2021/0034921 A1 | 2/2021 | Pinkovich et al. |
| 2021/0035447 A1 | 2/2021 | Urano et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0053570 A1 | 2/2021 | Akella et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2021/0094558 A1 | 4/2021 | Garcia et al. |
| 2021/0163031 A1 | 6/2021 | Jagbrant et al. |
| 2021/0201145 A1 | 7/2021 | Pham et al. |
| 2021/0233390 A1 | 7/2021 | Georgiou et al. |
| 2021/0263157 A1 | 8/2021 | Zhu |
| 2021/0271259 A1 | 9/2021 | Karpathy |
| 2021/0271898 A1 | 9/2021 | Chen et al. |
| 2021/0276574 A1 | 9/2021 | Efrat Sela et al. |
| 2021/0302992 A1 | 9/2021 | Chen et al. |
| 2021/0303922 A1 | 9/2021 | Tu et al. |
| 2021/0342609 A1 | 11/2021 | Smolyanskiy et al. |
| 2021/0347377 A1 | 11/2021 | Siebert et al. |
| 2021/0347383 A1 | 11/2021 | Siebert et al. |
| 2021/0358137 A1 | 11/2021 | Lee et al. |
| 2021/0380099 A1 | 12/2021 | Lee et al. |
| 2021/0406560 A1 | 12/2021 | Park et al. |
| 2022/0044034 A1 | 2/2022 | Roychowdhury et al. |
| 2022/0083785 A1 | 3/2022 | Subramanian et al. |
| 2022/0092349 A1 | 3/2022 | Yang |
| 2022/0105947 A1 | 4/2022 | Postnikov et al. |
| 2022/0153263 A1 | 5/2022 | Hotta et al. |
| 2022/0156525 A1 | 5/2022 | Guizilini et al. |
| 2022/0185625 A1 | 6/2022 | One |
| 2022/0227367 A1 | 7/2022 | Kario et al. |
| 2022/0299656 A1 | 9/2022 | Cui et al. |
| 2022/0383741 A1* | 12/2022 | Sanchez .................. G06F 1/163 |
| 2022/0402485 A1 | 12/2022 | Kobilarov et al. |
| 2023/0053785 A1 | 2/2023 | Carvalho et al. |
| 2023/0057509 A1 | 2/2023 | Emmons et al. |
| 2023/0085938 A1 | 3/2023 | He et al. |
| 2023/0110027 A1* | 4/2023 | Bajpayee .............. B60W 30/09 |
| | | 701/301 |
| 2023/0326215 A1 | 10/2023 | Yu et al. |

| | | |
|---|---|---|
| 2024/0160194 A1 | 5/2024 | Bakhshmand et al. |
| 2024/0317267 A1 | 9/2024 | Bergquist et al. |
| 2024/0353231 A1 | 10/2024 | Burlina et al. |
| 2024/0355132 A1 | 10/2024 | Duan et al. |
| 2025/0162612 A1 | 5/2025 | Woelki et al. |
| 2025/0171016 A1 | 5/2025 | Garimella et al. |
| 2025/0242803 A1 | 7/2025 | Brown et al. |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |

(56) References Cited

FOREIGN PATENT DOCUMENTS

| | | | |
|---|---|---|---|
| CN | 110751280 | A | 2/2020 |
| CN | 110826566 | A | 2/2020 |
| CN | 107451659 | B | 4/2020 |
| CN | 108111873 | B | 4/2020 |
| CN | 110956185 | A | 4/2020 |
| CN | 110966991 | A | 4/2020 |
| CN | 111027549 | A | 4/2020 |
| CN | 111027575 | A | 4/2020 |
| CN | 111047225 | A | 4/2020 |
| CN | 111126453 | A | 5/2020 |
| CN | 111158355 | A | 5/2020 |
| CN | 107729998 | B | 6/2020 |
| CN | 108549934 | B | 6/2020 |
| CN | 111275129 | A | 6/2020 |
| CN | 111275618 | A | 6/2020 |
| CN | 111326023 | A | 6/2020 |
| CN | 111428943 | A | 7/2020 |
| CN | 111444821 | A | 7/2020 |
| CN | 111445420 | A | 7/2020 |
| CN | 111461052 | A | 7/2020 |
| CN | 111461053 | A | 7/2020 |
| CN | 111461110 | A | 7/2020 |
| CN | 110225341 | B | 8/2020 |
| CN | 111307162 | B | 8/2020 |
| CN | 111488770 | A | 8/2020 |
| CN | 111539514 | A | 8/2020 |
| CN | 111565318 | A | 8/2020 |
| CN | 111582216 | A | 8/2020 |
| CN | 111598095 | A | 8/2020 |
| CN | 108229526 | B | 9/2020 |
| CN | 111693972 | A | 9/2020 |
| CN | 106558058 | B | 10/2020 |
| CN | 107169560 | B | 10/2020 |
| CN | 107622258 | B | 10/2020 |
| CN | 111767801 | A | 10/2020 |
| CN | 111768002 | A | 10/2020 |
| CN | 111783545 | A | 10/2020 |
| CN | 111783971 | A | 10/2020 |
| CN | 111797657 | A | 10/2020 |
| CN | 111814623 | A | 10/2020 |
| CN | 111814902 | A | 10/2020 |
| CN | 111860499 | A | 10/2020 |
| CN | 111881856 | A | 11/2020 |
| CN | 111882579 | A | 11/2020 |
| CN | 111897639 | A | 11/2020 |
| CN | 111898507 | A | 11/2020 |
| CN | 111898523 | A | 11/2020 |
| CN | 111899227 | A | 11/2020 |
| CN | 112101175 | A | 12/2020 |
| CN | 112101562 | A | 12/2020 |
| CN | 112115953 | A | 12/2020 |
| CN | 111062973 | B | 1/2021 |
| CN | 111275080 | B | 1/2021 |
| CN | 112183739 | A | 1/2021 |
| CN | 112232497 | A | 1/2021 |
| CN | 112288658 | A | 1/2021 |
| CN | 112308095 | A | 2/2021 |
| CN | 112308799 | A | 2/2021 |
| CN | 112313663 | A | 2/2021 |
| CN | 112329552 | A | 2/2021 |
| CN | 112348783 | A | 2/2021 |
| CN | 111899245 | B | 3/2021 |
| DE | 202017102235 | U1 | 5/2017 |
| DE | 202017102238 | U1 | 5/2017 |
| DE | 102017116017 | A1 | 1/2019 |
| DE | 102018130821 | A1 | 6/2020 |
| DE | 102019008316 | A1 | 8/2020 |
| EP | 1215626 | B1 | 9/2008 |
| EP | 2228666 | B1 | 9/2012 |
| EP | 2420408 | B1 | 5/2013 |
| EP | 2723069 | A1 | 4/2014 |
| EP | 2741253 | A1 | 6/2014 |
| EP | 3115772 | A1 | 1/2017 |
| EP | 2618559 | B1 | 8/2017 |
| EP | 3285485 | A1 | 2/2018 |
| EP | 2863633 | B1 | 2/2019 |
| EP | 3113080 | B1 | 5/2019 |
| EP | 3525132 | A1 | 8/2019 |
| EP | 3531689 | A1 | 8/2019 |
| EP | 3537340 | A1 | 9/2019 |
| EP | 3543917 | A1 | 9/2019 |
| EP | 3608840 | A1 | 2/2020 |
| EP | 3657387 | A1 | 5/2020 |
| EP | 2396750 | B1 | 6/2020 |
| EP | 3664020 | A1 | 6/2020 |
| EP | 3690712 | A1 | 8/2020 |
| EP | 3690742 | A1 | 8/2020 |
| EP | 3722992 | A1 | 10/2020 |
| EP | 3690730 | A2 | 11/2020 |
| EP | 3739486 | A1 | 11/2020 |
| EP | 3501897 | B1 | 12/2020 |
| EP | 3751455 | A2 | 12/2020 |
| EP | 3783527 | A1 | 2/2021 |
| GB | 2402572 | B | 8/2005 |
| GB | 2548087 | A | 9/2017 |
| GB | 2577485 | A | 4/2020 |
| GB | 2517270 | B | 6/2020 |
| JP | 2578262 | Y2 | 8/1998 |
| JP | 3941252 | B2 | 7/2007 |
| JP | 4282583 | B2 | 6/2009 |
| JP | 4300098 | B2 | 7/2009 |
| JP | 2015004922 | A | 1/2015 |
| JP | 5863536 | B2 | 2/2016 |
| JP | 6044134 | B2 | 12/2016 |
| JP | 6525707 | B2 | 6/2019 |
| JP | 2019101535 | A | 6/2019 |
| JP | 2020101927 | A | 7/2020 |
| JP | 2020173744 | A | 10/2020 |
| KR | 100326702 | B1 | 2/2002 |
| KR | 101082878 | B1 | 11/2011 |
| KR | 101738422 | B1 | 5/2017 |
| KR | 101969864 | B1 | 4/2019 |
| KR | 101996167 | B1 | 7/2019 |
| KR | 102022388 | B1 | 8/2019 |
| KR | 102043143 | B1 | 11/2019 |
| KR | 102095335 | B1 | 3/2020 |
| KR | 102097120 | B1 | 4/2020 |
| KR | 1020200085490 | A | 7/2020 |
| KR | 102189262 | B1 | 12/2020 |
| KR | 1020200142266 | A | 12/2020 |
| TW | 200630819 | A | 9/2006 |
| TW | I294089 | B | 3/2008 |
| TW | I306207 | B | 2/2009 |
| WO | WO 02/052835 | | 7/2002 |
| WO | WO 16/032398 | | 3/2016 |
| WO | WO 16/048108 | | 3/2016 |
| WO | WO 16/207875 | | 12/2016 |
| WO | WO 17/158622 | | 9/2017 |
| WO | WO 19/005547 | | 1/2019 |
| WO | WO 19/067695 | | 4/2019 |
| WO | WO 19/089339 | | 5/2019 |
| WO | WO 19/092456 | | 5/2019 |
| WO | WO 19/099622 | | 5/2019 |
| WO | WO 19/122952 | | 6/2019 |
| WO | WO 19/125191 | | 6/2019 |
| WO | WO 19/126755 | | 6/2019 |
| WO | WO 19/144575 | | 8/2019 |
| WO | WO 19/182782 | | 9/2019 |
| WO | WO 19/191578 | | 10/2019 |
| WO | WO 19/216938 | | 11/2019 |
| WO | WO 19/220436 | | 11/2019 |
| WO | WO 20/006154 | | 1/2020 |
| WO | WO 20/012756 | | 1/2020 |
| WO | WO 20/025696 | | 2/2020 |
| WO | WO 20/034663 | | 2/2020 |
| WO | WO 20/056157 | | 3/2020 |
| WO | WO 20/076356 | | 4/2020 |
| WO | WO 20/097221 | | 5/2020 |
| WO | WO 20/101246 | | 5/2020 |
| WO | WO 20/120050 | | 6/2020 |
| WO | WO 20/121973 | | 6/2020 |
| WO | WO 20/131140 | | 6/2020 |
| WO | WO 20/139181 | | 7/2020 |
| WO | WO 20/139355 | | 7/2020 |

(56) References Cited

FOREIGN PATENT DOCUMENTS

| | | |
|---|---|---|
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |
| WO | WO-2020/245654 A1 | 12/2020 |

OTHER PUBLICATIONS

Hu et al., "SINet: A Scale-Insensitive Convolutional Neural Network for Fast Vehicle Detection," 2019, IEEE Transactions on Intelligent Transportation Systems, vol. 20, Issue 3, 18 Pages.

Kumar et al., "OmniDet: Surround View Cameras Based Multi-Task Visual Perception Network for Autonomous Driving," 2021, IEEE, Robotics and Automation Letters, vol. 6, Issue 2 (8 Pages).

Li et al., "One-Stage Multi-Sensor Data Fusion Convolutional Neural Network for 3D Object Detection," 2019, 18 Pages.

International Preliminary Report on Patentability on PCT/US2022/040784 Dtd Feb. 29, 2024 (10 pages).

International Preliminary Report on Patentability on PCT/US2022/040793 Dtd Feb. 29, 2024 (10 pages).

International Preliminary Report on Patentability on PCT/US2022/040906 Dtd Feb. 29, 2024 (9 pages).

ISR and WO on PCT patent application No. PCT/US2022/040793 dated Oct. 25, 2023 (30 pages).

International Search Report and Written Opinion on PCT Appl. No. PCT/US2022/040784 dated Dec. 7, 2022 (15 pages).

International Search Report and Written Opinion on PCT Appl. No. PCT/US2022/040793 dated Nov. 30, 2022 (17 pages).

International Search Report and Written Opinion on PCT Appl. No. PCT/US2022/040906 dated Nov. 18, 2022 (16 pages).

Duzceker, et al., "DeepVideoMVS: Multi-View Stereo on Video with Recurrent Spatio-Temporal Fusion," arXiv:2012.02177, 16 pages (2021).

* cited by examiner

400

Obtain images from image sensors positioned about autonomous vehicle — 402

Determine visibility information for at least a portion of the images — 404

Cause adjustment of operation of autonomous vehicle based on visibility information — 406

FAIL-SAFE CORRECTIVE ACTIONS BASED ON VISION INFORMATION FOR AUTONOMOUS VEHICLES

CROSS-REFERENCE TO RELATED APPLICATIONS

This application claims priority to U.S. Prov. App. No. 63/365,050 titled "FAIL-SAFE CORRECTIVE ACTIONS BASED ON VISION INFORMATION FOR AUTONO-MOUS VEHICLES" and filed on May 20, 2022, the dis-closure of which is hereby incorporated herein by reference in its entirety.

This application claims priority to U.S. Prov. App. No. 63/365,078 titled "VISION-BASED MACHINE LEARN-ING MODEL FOR AUTONOMOUS DRIVING WITH ADJUSTABLE VIRTUAL CAMERA" and filed on May 20, 2022, the disclosure of which is hereby incorporated herein by reference in its entirety.

BACKGROUND

Technical Field

The present disclosure relates to machine learning mod-els, and more particularly, to machine learning models using vision information.

Description of Related Art

Neural networks are relied upon for disparate uses and are increasingly forming the underpinnings of technology. For example, a neural network may be leveraged to perform object classification on an image obtained via a user device (e.g., a smart phone). In this example, the neural network may represent a convolutional neural network which applies convolutional layers, pooling layers, and one or more fully-connected layers to classify objects depicted in the image. As another example, a neural network may be leveraged for translation of text between languages. For this example, the neural network may represent a recurrent-neural network.

Complex neural networks are additionally being used to enable autonomous or semi-autonomous driving function-ality for vehicles. For example, an unmanned aerial vehicle may leverage a neural network to, in part, enable autono-mous navigation about a real-world area. In this example, the unmanned aerial vehicle may leverage sensors to detect upcoming objects and navigate around the objects. As another example, a car or truck may execute neural network(s) to autonomously or semi-autonomously navigate about a real-world area. At present, such neural networks may rely upon costly, or error-prone, sensors. Additionally, such neu-ral networks may lack accuracy with respect to detecting and classifying objects causing deficient autonomous or semi-autonomous driving performance.

Figure 1:
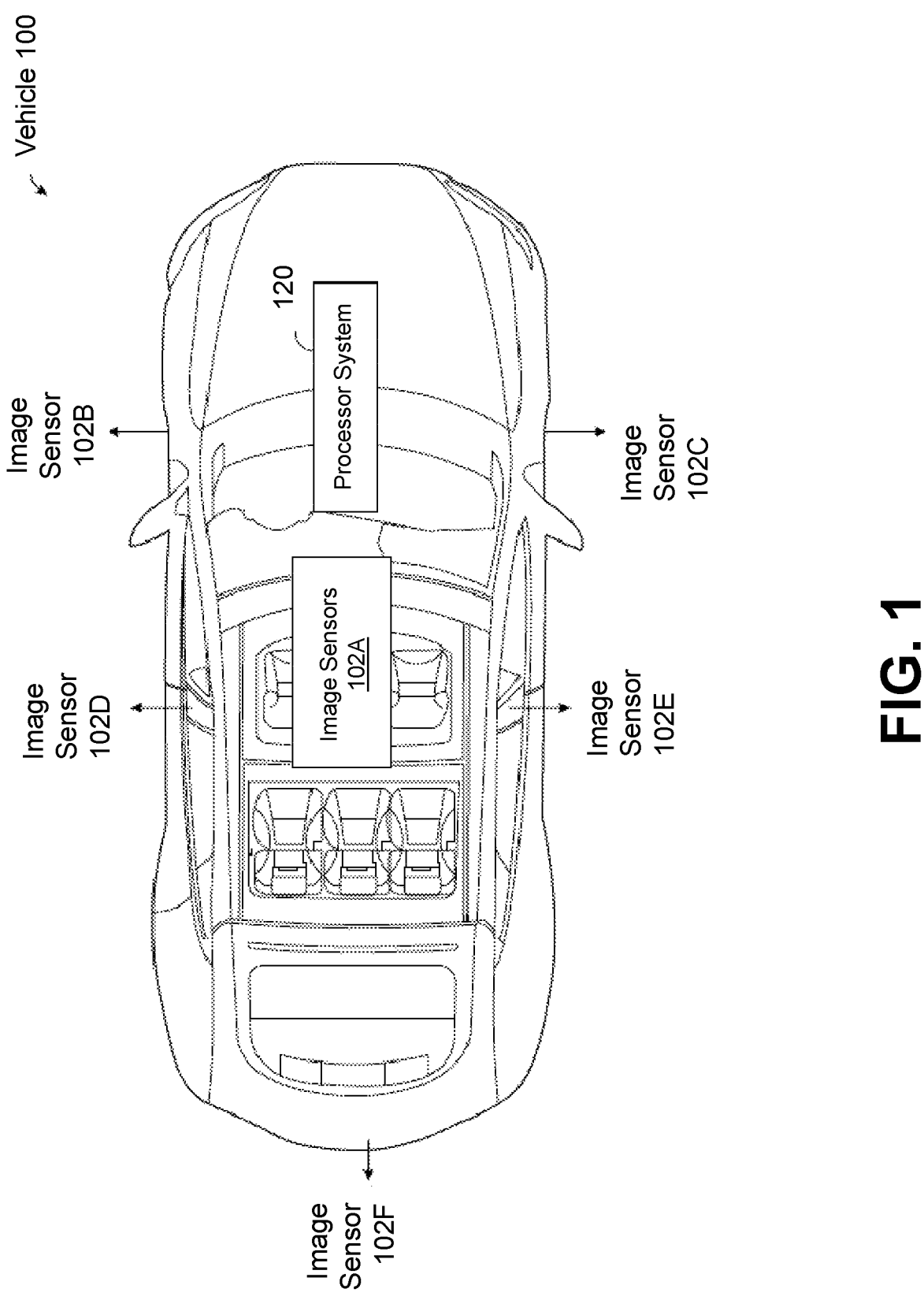
FIG. 1 is a block diagram illustrating an example autono-mous or semi-autonomous vehicle which includes a multi-tude of image sensors an example processor system.

Embodiments of the present disclosure and their advan-tages are best understood by referring to the detailed description that follows. It should be appreciated that like reference numerals are used to identify like elements illus-trated in one or more of the figures, wherein showings therein are for purposes of illustrating embodiments of the present disclosure and not for purposes of limiting the same.

DETAILED DESCRIPTION

Introduction

This application describes techniques to monitor for, and take fail-safe actions in response to, reduced visibility of image sensors during autonomous or semi-autonomous driv-ing of an autonomous vehicle (collectively referred to herein as autonomous driving). During operation of an autonomous vehicle, sensor information may be received, and processed, to effectuate autonomous driving. As may be appreciated, the sensors used to obtain the sensor information may have reduced visibility based on current weather (e.g., fog, snow, rain), objects blocking the sensors, and so on. Thus, to ensure safe and accurate autonomous driving this applica-tion describes techniques to reliably identify visibility issues. For example, a machine learning model (e.g., a convolutional neural network) may be used to characterize or model visibility associated with the sensor information. Based on the visibility issues, certain correction actions may be taken. For example, braking may be applied, or autono-mous operation may be temporarily turned off, to enable a person to take over driving.

The autonomous driving described herein may use image sensors, such as cameras, which are positioned about an autonomous vehicle. The image sensors may obtain images at a particular frame rate, or an adjustable frame rate, such as 30 Hz, 35 Hz, 60 Hz, and so on. In contrast to other autonomous driving techniques, in some embodiments only image sensors may be used. Thus, the autonomous driving may be performed using a vision-based system to identify objects and signals associated with the objects (e.g., a current lane of a vehicle, whether a vehicle has its door open, and so on). Example objects may include vehicles, pedes-trians, strollers, bikers, skateboarders, traffic signs, and so on.

In contrast, prior autonomous driving techniques may leverage other sensors. For example, radar may be used to, at least in part, detect objects which are proximate to an autonomous vehicle. Radar may also be used to inform velocities of these objects. During autonomous driving, radar may therefore be used to inform the presence, and/or velocity, of objects which are proximate to the autonomous vehicle. However, use of radar may introduce errors which cause deficient performance as compared to a vision-based technique. For example, radar may lead to phantom objects being detected. In this example, the autonomous vehicle may apply braking based on these phantom objects. As another example, combining radar and image sensors may introduce errors or complications which would not arise using only image sensors.

Thus, the description herein is focused on use of a vision-based machine learning model to determine information associated with objects proximate to an autonomous vehicle. As may be appreciated, however, the techniques described herein may be applied to any autonomous vehicle which uses image sensors (e.g., including those with other sensors, such as radar, Lidar, and so on). Since image sensors are being used, there may be situations in which visibility of these image sensors is reduced. As an example with respect to rain, a vehicle traveling in front of the autonomous vehicle may cause tire spray of water to occlude the vehicle. As another example, image sensors may depict a portion of an upcoming road segment as occluded by dense fog.

This application therefore describes techniques to identify, and mitigate the effects of, such reduced visibility conditions. For example, autonomous driving behavior may be adjusted based on the reduced visibility. Examples of adjusting behavior may include causing the autonomous vehicle to slow down, to change lanes, to pull over to the side of the road, to activate wipers, to activate a heater grid on a front or rear windshield (e.g., to remove snow or condensation, to function as a defogger), and so on.

Block Diagrams

FIG. 1 is a block diagram illustrating an example autonomous vehicle 100 which includes a multitude of image sensors 102A-102F an example processor system 120. The image sensors 102A-102F may include cameras which are positioned about the vehicle 100. For example, the cameras may allow for a substantially 360-degree view around the vehicle 100.

The image sensors 102A-102F may obtain images which are used by the processor system 120 to, at least, determine information associated with objects positioned proximate to the vehicle 100. The images may be obtained at a particular frequency, such as 30 Hz, 36 Hz, 60 Hz, 65 Hz, and so on. In some embodiments, certain image sensors may obtain images more rapidly than other image sensors. As will be described below, these images may be processed by the processor system 120 based on the vision-based machine learning model described herein.

Image sensor A 102A may be positioned in a camera housing near the top of the windshield of the vehicle 100. For example, the image sensor A 102A may provide a forward view of a real-world environment in which the vehicle is driving. In the illustrated embodiment, image sensor A 102A includes three image sensors which are laterally offset from each other. For example, the camera housing may include three image sensors which point forward. In this example, a first of the image sensors may have a wide-angled (e.g., fish-eye) lens. A second of the image sensors may have a normal or standard lens (e.g., 35 mm equivalent focal length, 50 mm equivalent, and so on). A third of the image sensors may have a zoom or narrow lens. In this way, three images of varying focal lengths may be obtained in the forward direction by the vehicle 100.

Image sensor B 102B may be rear-facing and positioned on the left side of the vehicle 100. For example, image sensor B 102B may be placed on a portion of the fender of the vehicle 100. Similarly, Image sensor C 102C may be rear-facing and positioned on the right side of the vehicle 100. For example, image sensor C 102C may be placed on a portion of the fender of the vehicle 100.

Image sensor D 102D may be positioned on a door pillar of the vehicle 100 on the left side. This image sensor 102D may, in some embodiments, be angled such that it points downward and, at least in part, forward. In some embodiments, the image sensor 102D may be angled such that it points downward and, at least in part, rearward. Similarly, image sensor E 102E may be positioned on a door pillow of the vehicle 100 on the right side. As described above, image sensor E 102E may be angled such that it points downwards and either forward or rearward in part.

Image sensor F 102F may be positioned such that it points behind the vehicle 100 and obtains images in the rear direction of the vehicle 100 (e.g., assuming the vehicle 100 is moving forward). In some embodiments, image sensor F 102F may be placed above a license plate of the vehicle 100.

While the illustrated embodiments include image sensors 102A-102F, as may be appreciated additional, or fewer, image sensors may be used and fall within the techniques described herein.

The processor system 120 may obtain images from the image sensors 102A-102F and detect objects, and signals associated with the objects, using a vision-based machine learning model. Based on the objects, the processor system 120 may adjust one or more driving characteristics or features. For example, the processor system 120 may cause the vehicle 100 to turn, slow down, brake, speed up, and so on.

In some embodiments, the processor system 120 may include one or more matrix processors which are configured to rapidly process information associated with machine learning models. The processor system 120 may be used, in some embodiments, to perform convolutions associated with forward passes through a convolutional neural network. For example, input data and weight data may be convolved. The processor system 120 may include a multitude of multiply-accumulate units which perform the convolutions. As an example, the matrix processor may use input and weight data which has been organized or formatted to facilitate larger convolution operations.

For example, input data may be in the form of a three-dimensional matrix or tensor (e.g., two-dimensional data across multiple input channels). In this example, the output data may be across multiple output channels. The processor system 120 may thus process larger input data by merging, or flattening, each two-dimensional output channel into a vector such that the entire, or a substantial portion thereof, channel may be processed by the processor system 120. As another example, data may be efficiently re-used such that weight data may be shared across convolutions. With respect to an output channel, the weight data 106 may represent weight data (e.g., kernels) used to compute that output channel.

Additional example description of the processor system, which may use one or more matrix processors, is included in U.S. Pat. No. 11,157,287, U.S. Patent Pub. 2019/0026250, and U.S. Pat. No. 11,157,441, which are hereby incorporated by reference in their entirety and form part of this disclosure as if set forth herein.

Figure 2A:
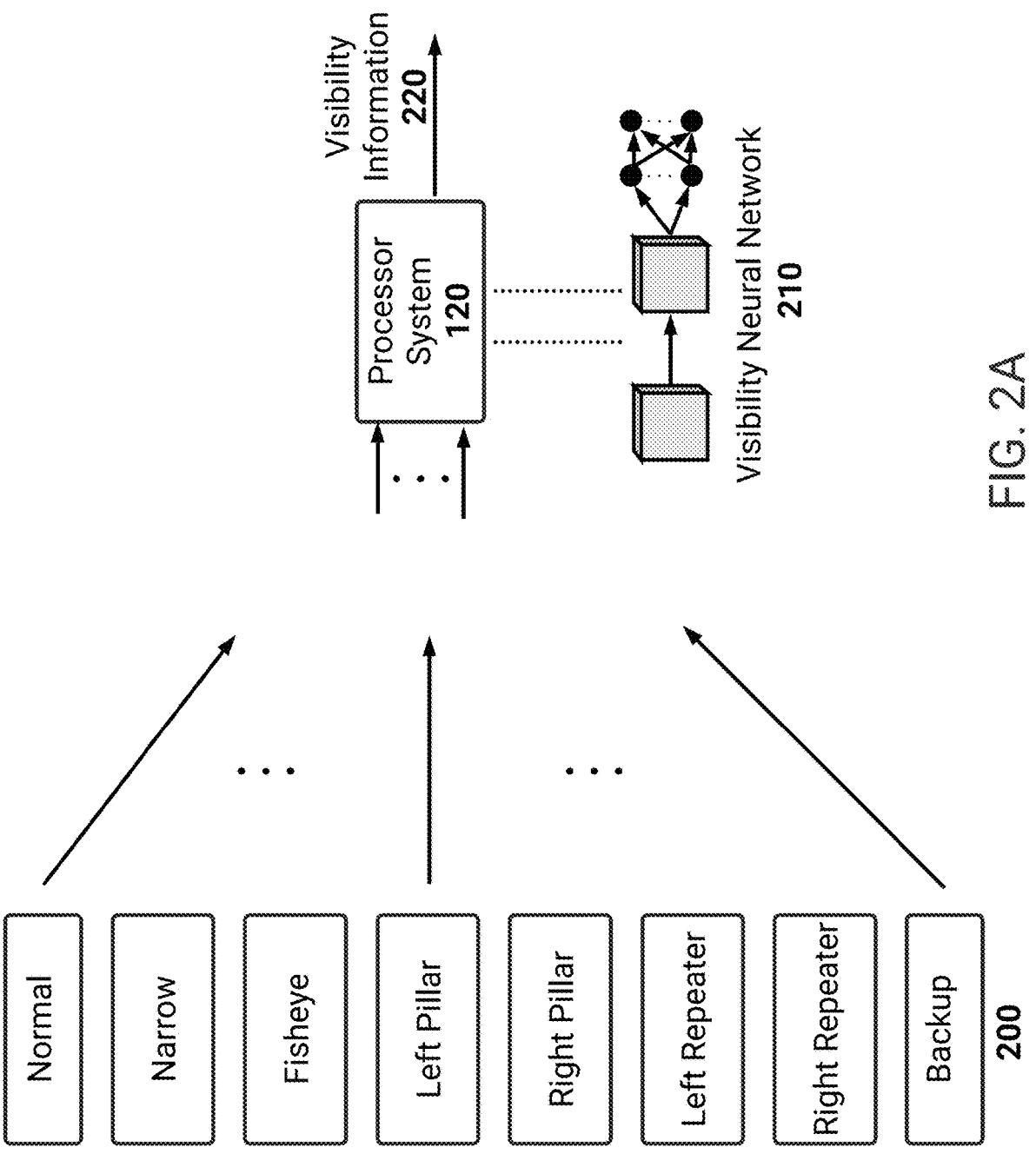
FIG. 2A is a block diagram illustrating the processor system determining visibility information based on received images.

FIG. 2A is a block diagram illustrating a processor system 120 which is included in a vehicle determining visibility information 220 based on received images 200. In the illustrated embodiment, the processor system 120 receives images 200 from a multitude of image sensors (e.g., image sensors 102A-10F). For example, the images 200 may be obtained by the image sensors at a substantially time. As described in FIG. 1, image sensors may be received at a particular frequency such that the processor system 120 generates visibility information 220 at the particular frequency. In some embodiments, the processor system 120 may generate visibility information 220 at a reduced frequency, such as via processing a subset of the received images or combining information from multiple received images.

The processor system 120 may optionally downsample, or otherwise pre-process, the images 200. For example, the images 200 may be received at a first resolution and downsampled to a second resolution (e.g., 320×240, 640×480, 1024×768, and so on). As another example, the images 200 may be cropped, for example to reduce consistent image features which may be included in images (e.g., a portion of a front of the vehicle).

The processor system 120 executes a machine learning model, which in the illustrated example is a convolutional neural network (e.g., the visibility neural network 120). The visibility neural network 120 may be trained using images and label information indicating visibility values for portions of the images. Each visibility value may represent a severity associated with a reduction in visibility for a portion of an image. For example, a visibility value may represent a measure associated with a portion of an image depicting an occlusion or being blurry. As an example, the visibility value may indicate whether the portion cannot be resolved and thus may be masking a real-world object behind it (e.g., fog may be occluding objects behind it).

In some embodiments, visibility values may be assigned based on a grid applied to the images. For example, an image may be divided into a multitude of portions with each portion being assigned a visibility value. In some embodiments, the visibility values may be selected from a range of values (e.g., 0-3, 1-3, 1-8, and so on). As an example, a portion which is severely occluded may receive the highest of the range while a portion which is not occluded may receive the lowest of the range. In some embodiments, only portions of an image which are associated with a reduction in visibility may be assigned visibility values. Thus, remaining portions which are not expected to introduce visibility issues during autonomous operation may not receive assignment of visibility values.

Optionally, a training image may be assigned one or more scene tags indicating reasons for which visibility is reduced. For example, a portion of an image may be assigned a visibility value indicating at least some loss of visibility. In this example, a scene tag may be identified as a label which caused the loss of visibility. Example scene tags may include haze, condensation, ice, water, rain, sun glare, fog, smoke, tire spray, dirty windshield, object in field of view (e.g., roof), hardware fault (e.g., out of focus camera, stuck or dead pixels, and so on).

The visibility neural network 210 may thus be trained using training images which are labeled to indicate visibility values and, in some embodiments, scene tags. The network 210 may include a multitude of convolutional layers followed by one or more fully-connected layers which are trained to output visibility values and, in some embodiments, scene tags.

With respect to training, in some embodiments a multitude of visibility neural networks may be trained and used at inference time by the processor system 120. For example, the left pillar image sensor may have a different visibility neural network than the left repeater. In this example, the visibility neural network for the left pillar may be trained using images obtained from the left pillars of different vehicles which are similar to the vehicle. In contrast, the visibility neural network for the left repeater may be trained using images obtained from the left repeaters of different vehicles.

To ensure that sufficient training data is obtained, the vehicles may optionally execute classifiers which are triggered to obtain images which satisfy certain conditions. For example, vehicles operated by end-users may automatically obtain training images which depict, for example, tire spray, rainy conditions, snow, fog, fire soke, and so on. Further description related to use of classifiers is described in U.S. Patent Pub. No. 2021/0271259 which is hereby incorporated herein by reference in its entirety as if set forth herein.

The processor system 120 may compute respective forward passes through the visibility neural network 210 for the images 200. For example, each image may be considered separately. As described above, each image sensor may be associated with a different neural network. In some embodiments, images from the backup image sensor may not be considered by the processor system 120. While visibility information 220 is illustrated in FIG. 2A, it may be understood that in some embodiments the visibility information 220 is specific to each image sensor. Thus, visibility information 220 may be analyzed by the processor system 120 to determine whether one of the forward image sensors has reduced visibility in contrast to one of the pillar image sensors, and so on.

Example visibility information 220 may include visibility values assigned by the processor system 120 based on the visibility neural network 210. Optionally, visibility information 220 may indicate one or more scene tags as described above.

Figure 2B:
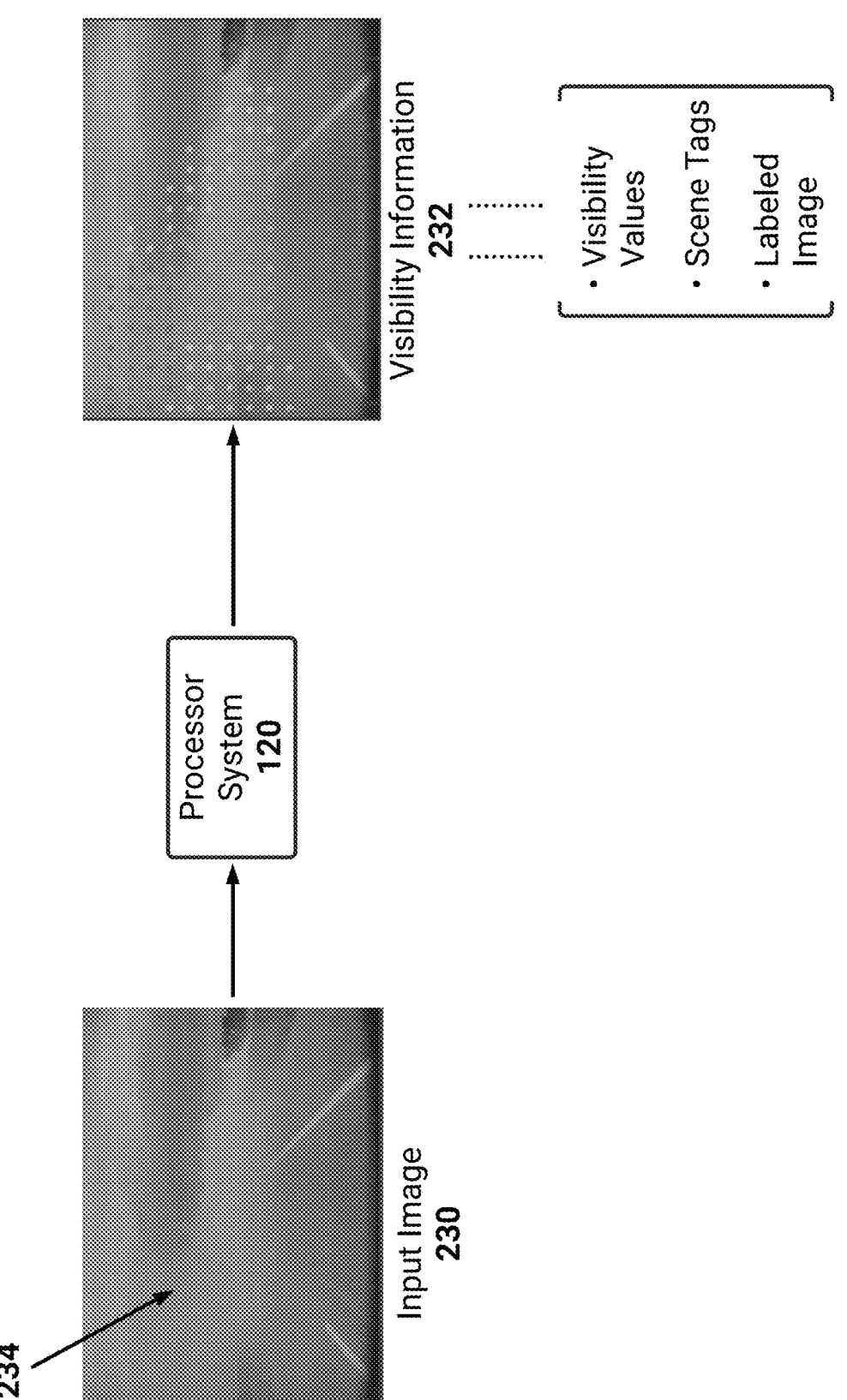
FIG. 2B is a block diagram illustrating examples of visibility information determined based on a received image.

FIG. 2B is a block diagram illustrating examples of visibility information 232 determined based on a received image 230. The example image 230 may represent an image obtained from a forward image sensor, such as the normal image sensor described above. As illustrated in the image 230, a portion 234 of the image is occluded (e.g., via smoke and/or fog).

The processor system 120 has analyzed the image 230, for example using the machine learning model described above, and has generated visibility information 232 for the image 230. As illustrated, the visibility information 232 indicates that the portion 234 is, at least in part, occluded. For example, the red may indicate a high loss of visibility while the orange may indicate a lesser loss and the white may indicate an event lesser loss. While FIG. 2B illustrates colors, as may be appreciated during operation of the vehicle the processor system 120 may output numerical visibility values for the portion 234.

Figure 2C:
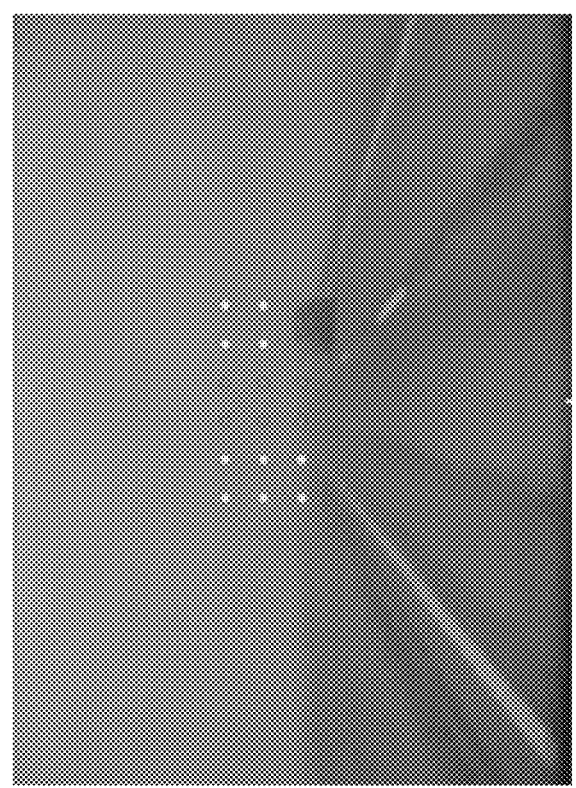
FIGS. 2C-2E illustrate example images labeled with grids of visibility values.
Figure 2C:
Figure 2C:
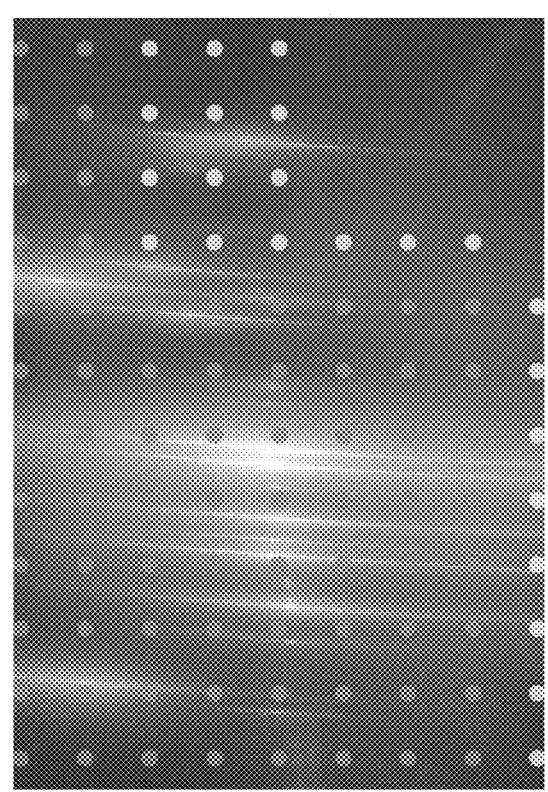
Figure 2D:
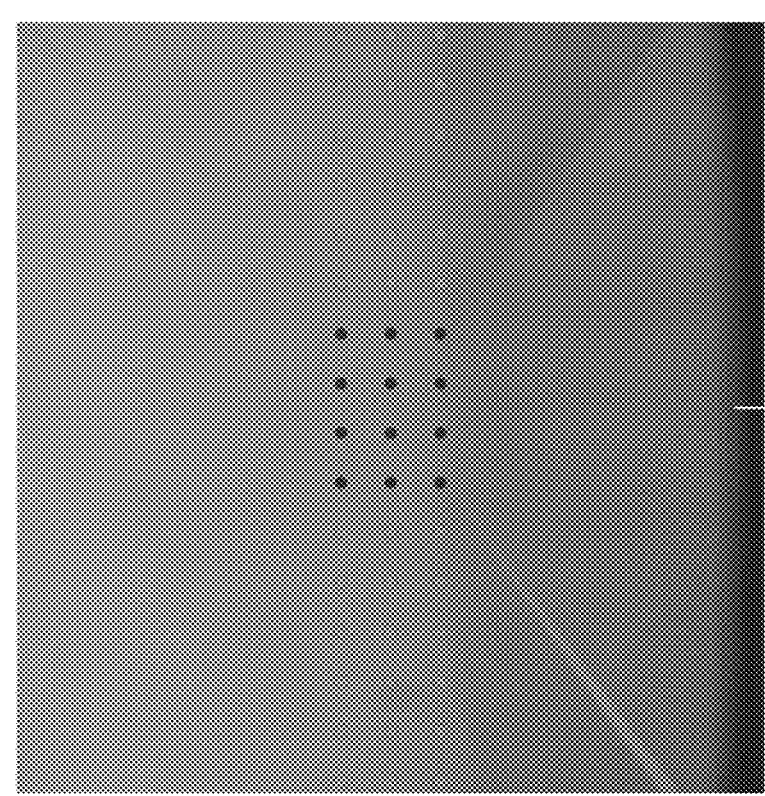
Figure 2D:
Figure 2E:
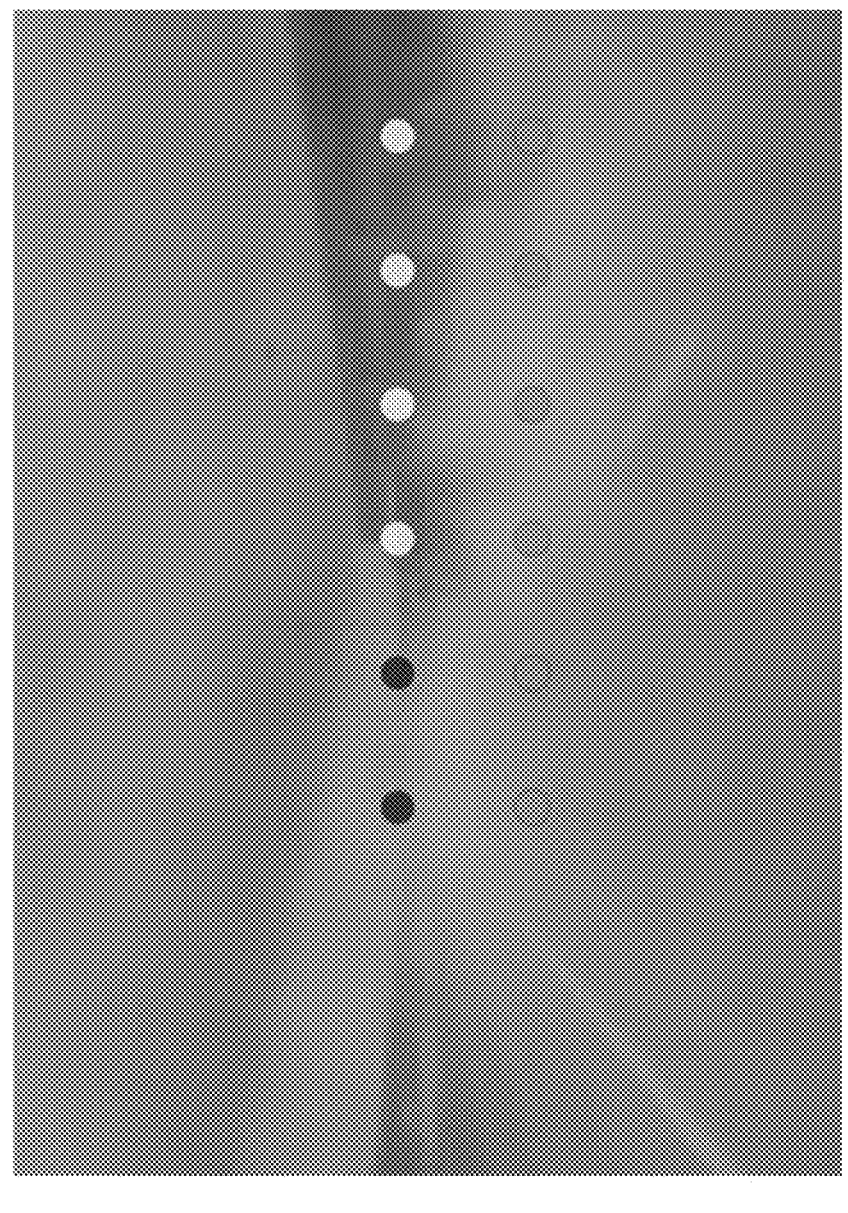

FIGS. 2C-2E illustrate example images labeled with grids of visibility values. These images may represent training images labeled by persons, such as labeling experts. For example, the persons may use a user interface to assign visibility values to the training images. The images may also represent a graphical representation of output based on the above-described machine learning model.

Figure 3A:
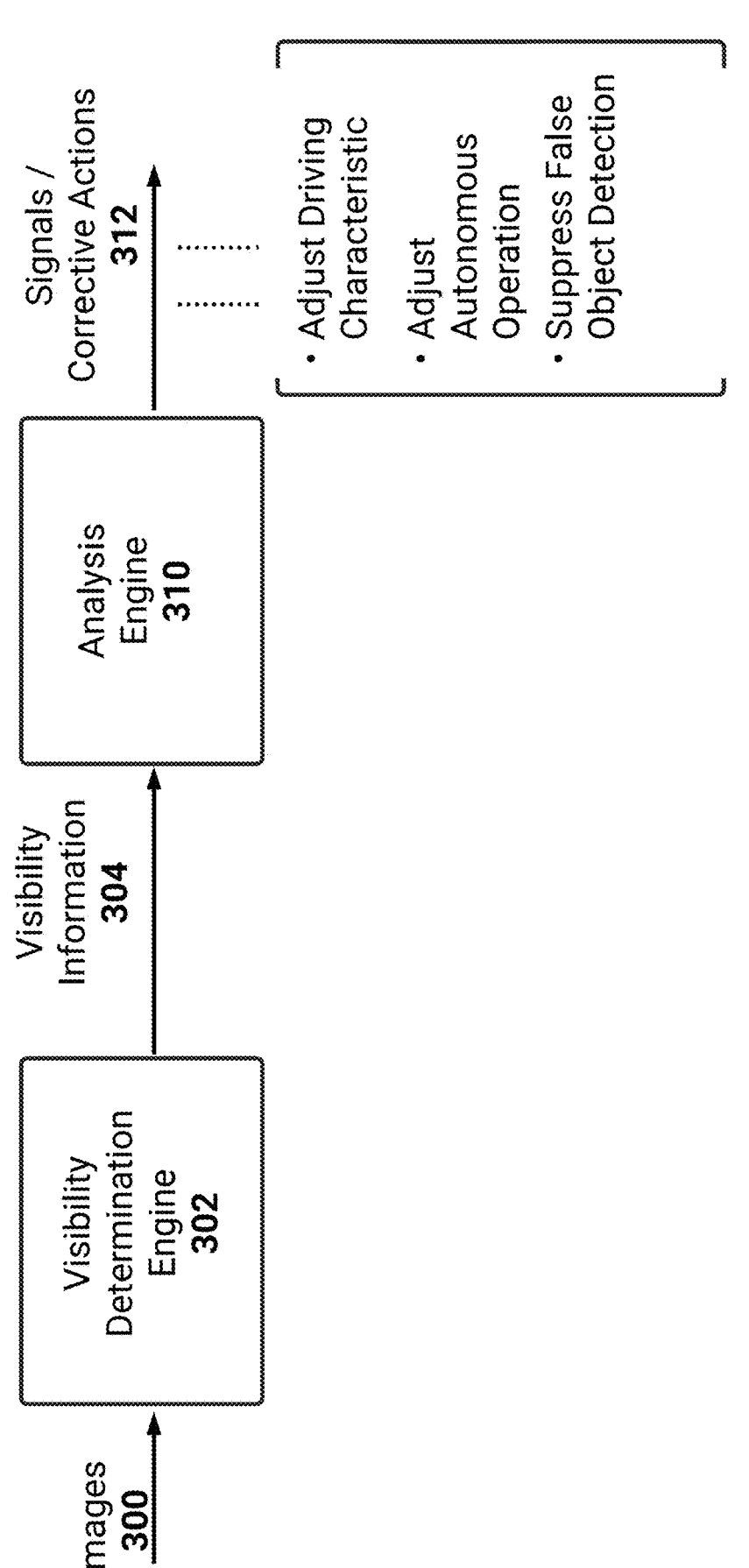
FIG. 3A is a block diagram illustrating example signals/corrective actions to be used by an autonomous vehicle.

FIG. 3A is a block diagram illustrating example signals/corrective actions 312 to be used by an autonomous vehicle during autonomous operation. As described above, images 300 may be received by the processor system 120 and analyzed to determine visibility information 304. In the illustrated example, the processor system 120 is executing a visibility determination engine 302 to output the visibility information 304. The engine 320 may implement the above-described machine learning model.

FIG. 3A additionally illustrates an analysis engine 310 which outputs signals/corrective actions 312 to be taken based on the visibility information 304. In some embodiments, the analysis engine 310 may represent a vision-based machine learning model which obtains images and determines objects and associated signals based on the images. Thus, the visibility information 304 may represent information provided to as input to a portion of the vision-based machine learning model. The analysis engine 310 may also represent separate logic or a separate model which generates the signals/corrective actions 312.

In some embodiments, and with respect to a range of visibility values between 0-3, if the visibility information 304 includes greater than a threshold number of 3s then the signals/corrective actions 312 may cause the autonomous vehicle to turn off an autonomous mode and have a driver take over. For example, the 3s may be associated with a forward direction (e.g., from forward-facing images) if the autonomous vehicle is moving forward. Similarly, if the autonomous vehicle is going to turn left or right into a different lane the vehicle may have a driver take over if the left and right image sensors have greater than a threshold number of 3s.

With respect to the example visibility values above, the signals/corrective actions 312 may cause the autonomous vehicle to slow down if there are greater than a threshold number of 2s (e.g., associated with images depicting a forward direction). If the visibility values are a mix of 1s and 2s, the autonomous vehicle may reduce a speed temporarily.

In some embodiments, the analysis engine 310 may take greater actions based on images from the forward sensors. For example, if the autonomous vehicle is driving on a highway in a lane going forward, and forward sensors have normal visibility while left and/or right sensors have reduced visibility, then the signals/corrective actions 312 may indicate that the autonomous vehicle can proceed normally. The left and/or right image sensors may be considered, or otherwise weighted more heavily, when an upcoming turn is approaching.

In general, the illustrated signals/corrections actions 312 may include one or more of the following: adjust a driving characteristic, adjust autonomous operation, and suppress false object detection. A driving characteristic may include actions such as, slowing down, braking, turning on headlights, turning on hazard lights, turning on wipers (e.g., for a scene tag of rain) and/or windshield heaters, and so on. For example, if the visibility information 304 indicates a scene tag of snow, then the actions 312 may cause the autonomous vehicle to turn on windshield heaters. Adjusting autonomous operation may include changing lanes (e.g., if tire spray is bad in one lane the vehicle may move two lanes over), pulling over, causing a driver to take over, and so on.

Suppressing false object detections may be used by, for example, a vision-based machine learning model to identify times at which an object, such as a vehicle, is not actually positioned proximate to the autonomous vehicle (e.g., a phantom object). For example, due to a visual appearance of certain visibility reducing objects (e.g., smoke, fog), the vision-based machine learning model may inaccurately identify an object as being present proximate to the vehicle. In this example, the object may represent a false positive object which does not exist in the real-world. The vision-based machine learning model may use the visibility information 304 to identify that reduced visibility may be a cause of the phantom object. Thus, certain autonomous operations may be suppressed (e.g., braking for the phantom object).

Figure 3B:
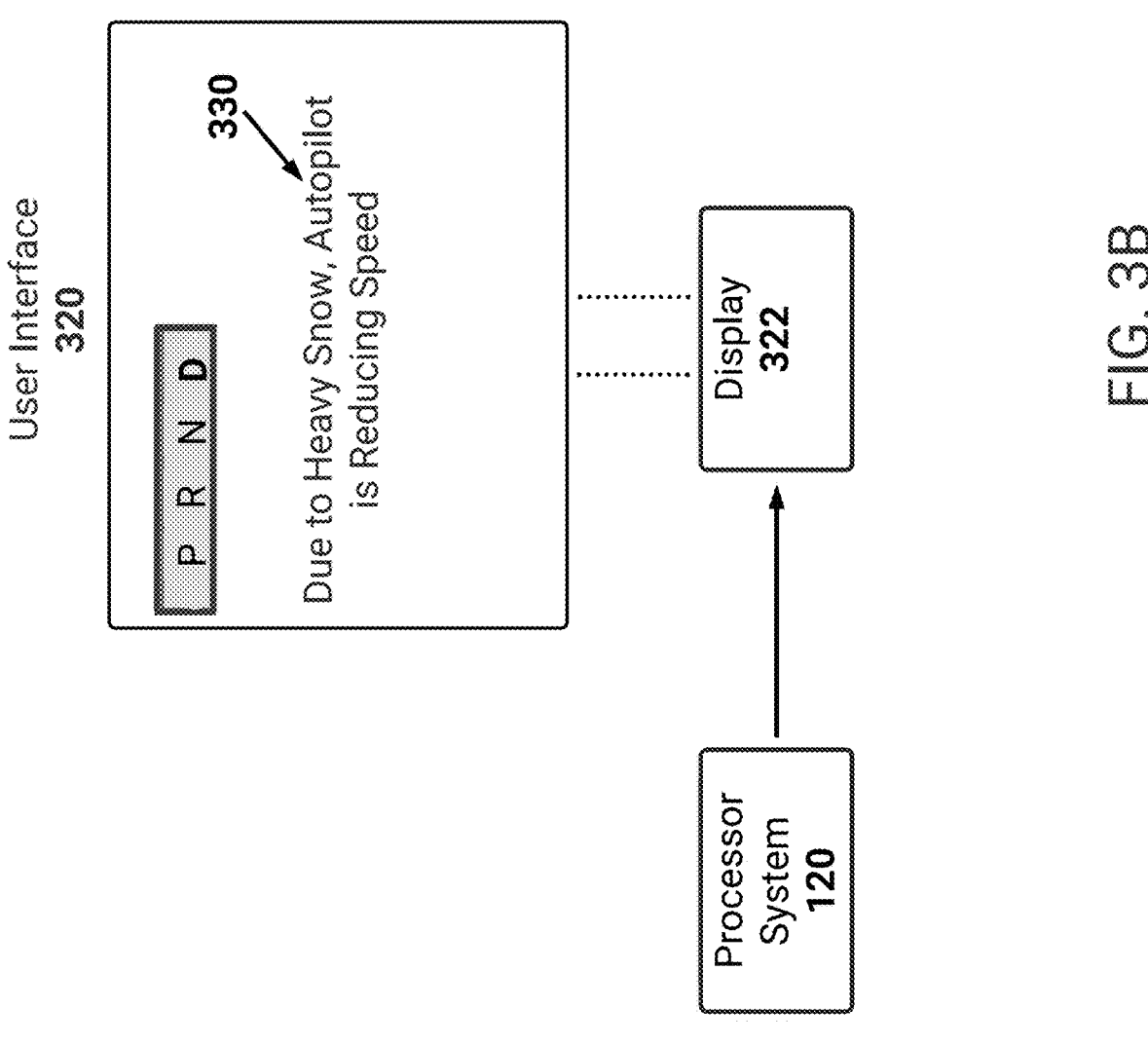
FIG. 3B is a block diagram illustrating an example user interface identifying an example signal/corrective action.

FIG. 3B is a block diagram illustrating an example user interface 320 identifying an example signal/corrective action. In the illustrated example, a display 322 included in the autonomous vehicle may present a user interface for the benefit of a driver or passenger. As described above, lack of visibility (e.g., in a forward direction, or a direction of travel such as when the autonomous vehicle is turning) may cause autonomous operation to be turned, or otherwise toggled, off. The user interface 320 may therefore present information indicating an adjustment to autonomous operation and a reason 330. In some embodiments, the reason may be determined based on the scene tag (e.g., snow). In some embodiments, the user interface may request a driver or passenger to take an action (e.g., clean an image sensor or housing in which the image sensor is included). In some embodiments, the techniques described herein may determine a hardware fault. For example, over time a portion of an image sensor may experience a fault (e.g., a wire may move, such as to occlude the portion of the image sensor). In this example, the user interface may indicate that the driver or passenger have the image sensor serviced.

Example Flowchart

Figure 4:
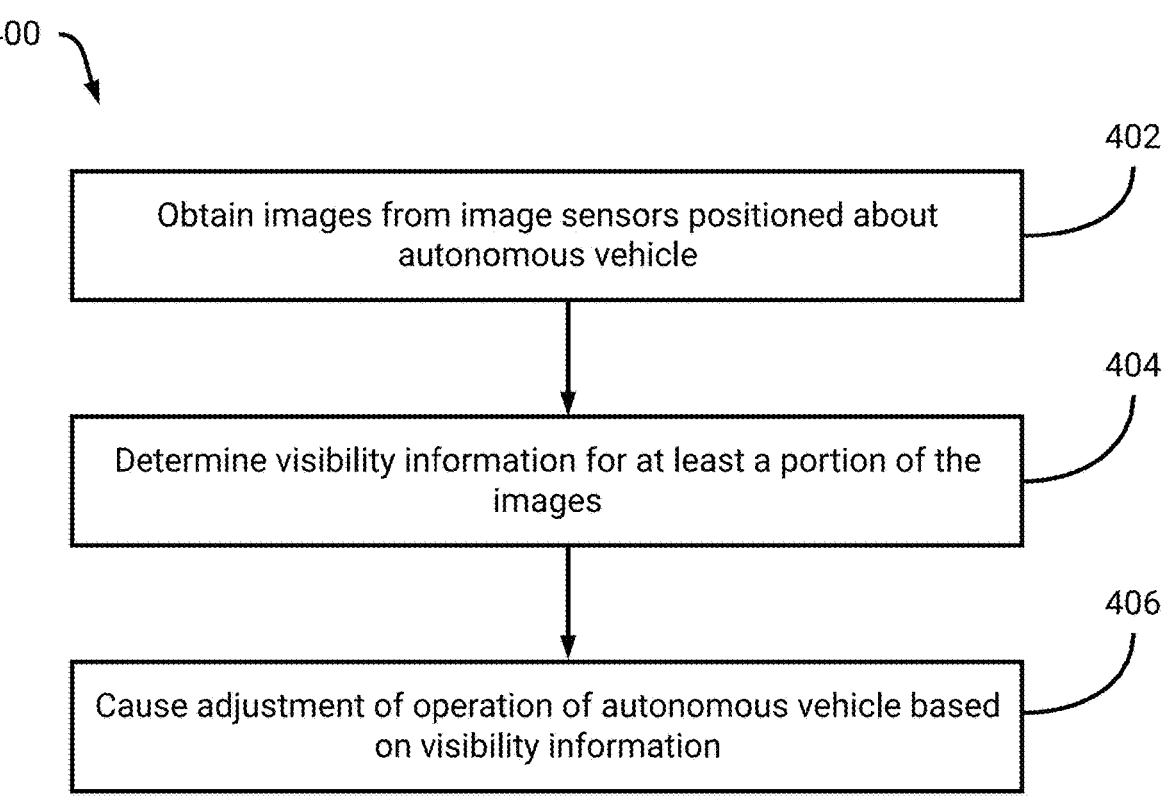
FIG. 4 is a flowchart an example process for determining visibility information to be used in autonomous driving.

FIG. 4 is a flowchart of an example process 400 for determining visibility information to be used in autonomous driving. For convenience, the process 400 will be described as being performed by a system of one or more processors which is included in a vehicle (e.g., the processor system 120).

At block 402, the system obtains images from image sensors positioned about autonomous vehicle. As illustrated in FIG. 1, the vehicle may include a number of image sensors which provide a substantially 360-degree view about the vehicle.

At block 404, the system determines visibility information for at least a portion of the images. As described in FIG. 2A, and as described in FIG. 5 below, the system computes a forward pass through a machine learning model (e.g., a convolutional neural network) to determine visibility information. In some embodiments, each of the image sensors may be associated with a different convolutional neural network. Example visibility information may include visibility values for portions of each image (e.g., according to a grid). Example visibility information may further include one or more scene tags associated with the images.

At block 406, the system causes adjustment of operation of the vehicle based on visibility information. As described in FIG. 3A, and FIG. 5, the system may cause the vehicle to take actions, such as slowing down, braking, changing lanes, turning off autonomous operation, activating windshield heaters, activating defoggers via the air conditioning system, and so on.

Virtual Camera Network

In some embodiments, a machine learning model (referred to herein as a virtual camera network) may be used to determine information relevant to objects positioned about a vehicle. For example, the objects may be static or dynamic objects. In this example, the virtual camera network may represent a vision-system which detects, and classifies, objects. As an example, and with respect to the above-described visibility information 220, the virtual camera network may segment relevant objects (e.g., rain on image sensors or sensor housing, haze, fog, snow, lens flares or streaks) and determine scene tags (e.g., sun glare, fog).

Example static objects may include objects expected to be substantially fixed or unaltered as an autonomous vehicle navigates. For example, static objects may include lane markings, crosswalks, bike lanes, direction of travel for a road or lane therein, intersections, connectivity between lanes which are separated via an intersection, and so on. Dynamic objects may include objects which are expected to adjust in position, velocity, and so on. Example dynamic objects may include vehicles, pedestrians, bicycles, and so on As an example of a static object, a lane may be expected to have traffic flow in a same direction as the autonomous vehicle navigates proximate to that lane. In this example, and as may be appreciated, a governmental officer (e.g., a police officer), or sign, may temporarily adjust the direction of traffic. This temporary adjustment may represent a feature or characteristic of the real-world environment and thus may be a static object or information which is detectable via the virtual camera network.

The virtual camera network may associate objects with a vector space according to an orientation or position of a virtual camera. For example, in some embodiments a birds-eye view may be used in which the virtual camera is pointing downwards toward a vehicle. With respect to the above-example static objects, the birds-eye view may allow for a rapid understanding of important elements which are relied upon to effectuate autonomous driving. Indeed, stationary objects may inform the outlines of what is navigable in a real-world environment. For example, lane markings can be included in the birds-eye view as would be seen on a navigation map. In this example, the lane markings may be relied upon to inform future navigation options which are available to an autonomous vehicle. As another example, segmented outlines of puddles, snow, ice, and so on, may inform navigation options available to the vehicle. Additionally, determined scene tags (e.g., and associated confidences) may cause autonomous driving functionality to be altered (e.g., as described above at least in FIGS. 3A-3B.

Another example orientation or position may include the virtual camera being at a distance above the vehicle and pointing forwards (e.g., at a particular angle). Thus, objects which extend further forward may be detected. Additionally, particular objects such as pedestrians may be more reliably detected and associated information (e.g., position, velocity) determined.

The virtual camera network described herein may include disparate elements which, in some embodiments, may be end-to-end trained. Images from image sensors may be provided to respective backbone networks. In some embodiments, these backbone networks may be convolutional neural networks which output feature maps for use later in the network. A transformer network, such as a self-attention network, may receive the feature maps and transform the information into an output vector space. A feature queue may then push the output from the transformer network, optionally along with kinematics of a vehicle (e.g., an autonomous vehicle), into a queue which is optionally spatially indexed. In some embodiments, the feature queue may be spatially indexed such that information is aggregated over a previous threshold distance as the vehicle navigates in a direction. For example, a puddle on the ground may be identified over a distance even as portions of it are occluded in time.

Output from the feature queues may be provided to one or more video modules (e.g., video queues) for processing. In some embodiments, a video module may be a convolutional neural network, a recurrent neural network, or a transformer network. Trunks of the virtual camera network may then obtain output, or a particular portion thereof, from the video module and generate output information using respective heads. The example output may include the above-described information associated with objects, such as visibility information.

Figure 5:
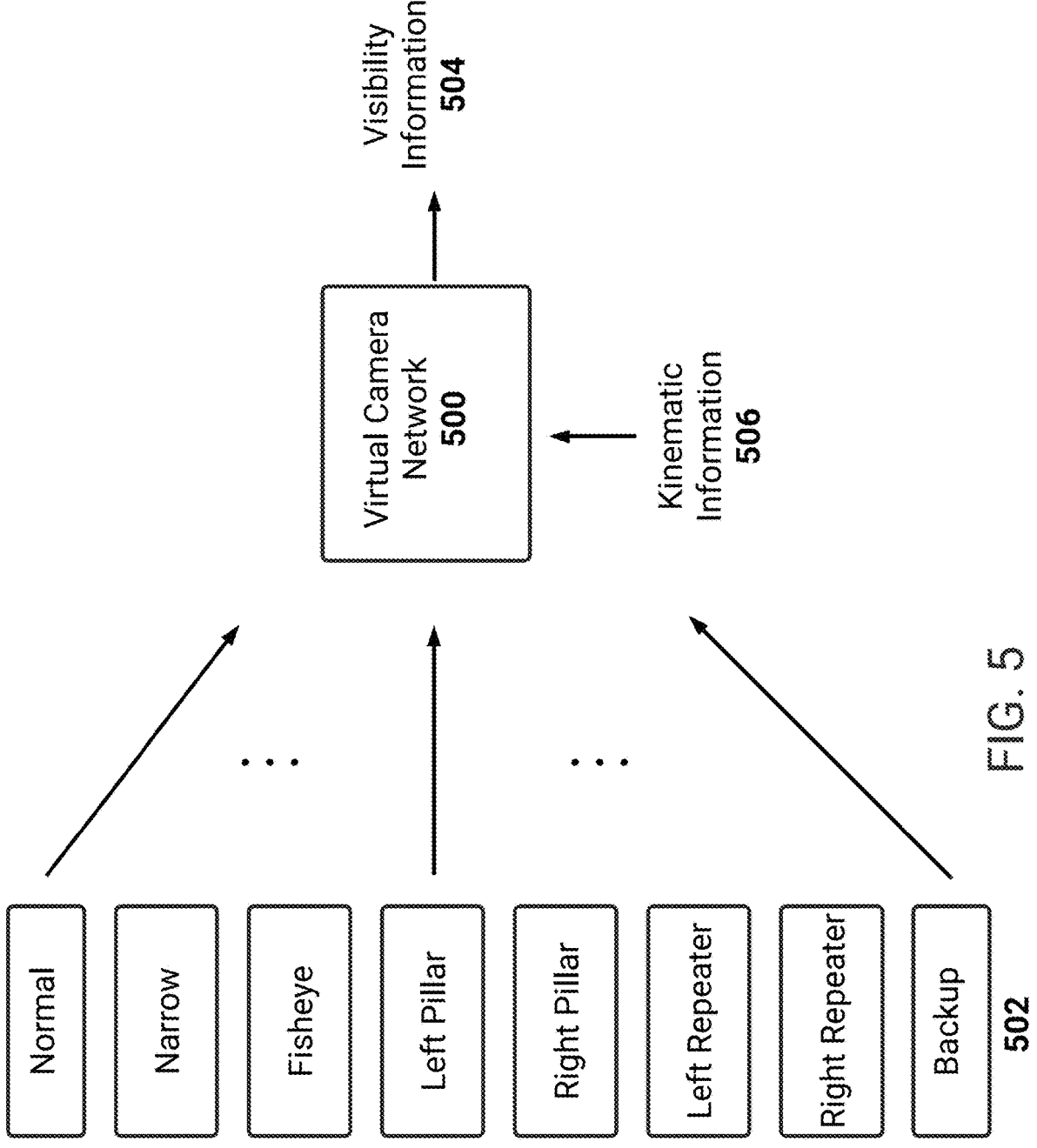
FIG. 5 is a block diagram illustrating the processor system determining visibility information using a virtual camera network.

FIG. 5 is a block diagram illustrating the processor system determining visibility information 504 using a virtual camera network 500. As illustrated in FIG. 5, backbone networks 502 may receive images from different image sensors as input. Thus, the backbone networks 502 process the raw pixels included in the images. In some embodiments, the backbone networks 502 may be convolutional neural networks. For example, there may be 5, 10, 15, and so on, convolutional layers in each backbone network. In some embodiments, the backbone networks 502 may include residual blocks, recurrent neural network-regulated residual networks, and so on.

The backbone networks 502 may thus output feature maps (e.g., tensors) which are used by virtual camera network 500. In some embodiments, the output from the backbone networks 502 may be combined into a matrix or tensor. In some embodiments, the output may be provided as a multitude of tensors (e.g., 8 tensors in the illustrated example) to the virtual camera network 500.

The output tensors from the backbone networks 502 may be combined (e.g., fused) together into a virtual camera space (e.g., a vector space) via the virtual camera network 500. For example, a transformer network may be trained to perform multi-camera fusion and project information into the vector camera space.

The image sensors positioned about the autonomous vehicle may be at different heights of the vehicle. For example, the left and rear pillar image sensors may be positioned higher than the left and rear front bumper image sensors. Thus, to allow for a consistent view of objects positioned about the vehicle, the virtual camera space may be used. In an example described herein, the virtual camera space is a birds-eye view (e.g., top-down view) of static objects positioned about the autonomous vehicle. In some embodiments, the birds-eye view may extend laterally by about 70 meters, 80 meters, 100 meters, and so on. In some embodiments, the birds-eye view may extend longitudinally by about 80 meters, 100 meters, 120 meters, 150 meters, and so on. For example, the birds-eye view may include static objects which are positioned in a real-world environment in the lateral and/or longitudinal distance.

For certain information determined by the virtual camera network 500, the autonomous vehicle's kinematic information 506 may be used. Example kinematic information 506 may include the autonomous vehicles velocity, acceleration, yaw rate, and so on. In some embodiments, the images may be associated with kinematic information 206 determined for a time, or similar time, at which the images were obtained. For example, the kinematic information 506, such as velocity, yaw rate, acceleration, may be encoded (e.g., embedded into latent space), and associated with the images.

The virtual camera network 500 may include one or more trunks or heads which may be trained to generate specific types of output. In some embodiments, the trunks or heads may relate to edges, lines, dividers, islands, intersections, drivable space, restricted regions, road blockage, traffic flow, crosswalks, visibility, and so on.

The trunks or heads may additionally output the visibility information 504 described herein. For example, the trunks or heads may output certain information which his segmented, such as water droplets on cameras, on roads, haze, camera blockages, lens streaks, and so on as described herein. The trunks or heads may additionally output the scene tags described herein.

As may be appreciated, the virtual camera network 500 may be trained based on ground truth information indicative of different types of visibility information. For example, and with respect to FIG. 2B, an input image 230 may include occluded portions (e.g., due to haze, smoke, and so on). In contrast to the techniques described above with respect to FIGS. 1-4, the virtual camera network 500 may segment the haze. Thus, the network 500 may determine an outline associated with the haze. Similarly, the network 500 may determine a scene tag reflected of the haze or smoke.

The above-described information may be output from the virtual camera 500 and used downstream to, as an example, adjust behavior of autonomous driving. For example, the vehicle may reduce its speed based on reduced visibility caused by the haze or smoke. In this example, the output of the virtual camera network 500 may be used in a seamless manner to indicate segmented objects, and scene tags, which may impact visibility. Thus, the vehicle may intelligently adjust its behavior as described herein, for example in FIGS. 1-4.

In this way, the virtual camera network 500 may reduce an autonomous vehicle's reliance on the numerically labeled training data described herein. For example, and as described above, a user (e.g., a human user or software agent) may assign visibility values to training images. In contrast, the virtual camera network 500 may use ground truth data reflective of segments of objects which cause at least loss of visibility. Similar to a human driver, the network 500 may determine an extent to which heavy rain causes a loss of visibility due to rain covering a windshield, camera, and so on.

Vehicle Block Diagram

Figure 6:
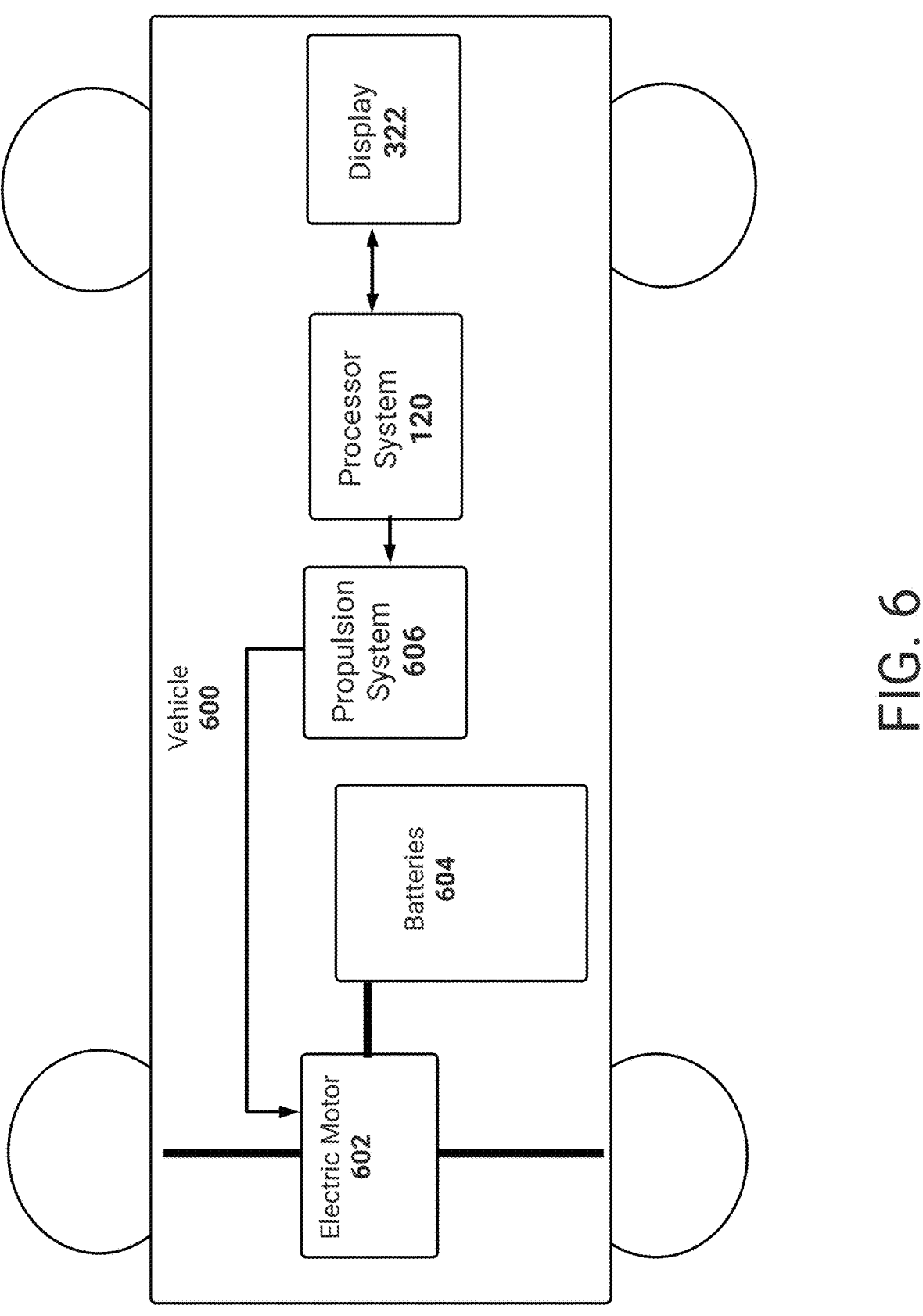
FIG. 6 is a block diagram illustrating an example vehicle which includes the vehicle processor system.

FIG. 6 illustrates a block diagram of a vehicle 600 (e.g., vehicle 100). The vehicle 600 may include one or more electric motors 602 which cause movement of the vehicle 600. The electric motors 602 may include, for example, induction motors, permanent magnet motors, and so on. Batteries 604 (e.g., one or more battery packs each comprising a multitude of batteries) may be used to power the electric motors 602 as is known by those skilled in the art.

The vehicle 600 further includes a propulsion system 606 usable to set a gear (e.g., a propulsion direction) for the vehicle. With respect to an electric vehicle, the propulsion system 606 may adjust operation of the electric motor 602 to change propulsion direction.

Additionally, the vehicle includes the processor system 120 which processes data, such as images received from image sensors 102A-102F positioned about the vehicle 600. The processor system 100 may additionally output information to, and receive information (e.g., user input) from, a display 322 included in the vehicle 600. For example, the display may present graphical depictions of objects positioned about the vehicle 600. As another example, the display may present information associated with determined visibility.

Other Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a processor system included in a vehicle, the method comprising:

obtaining first images from first image sensors positioned at fixed locations about the vehicle, the first image sensors corresponding to machine learning models that are trained using second images obtained from second image sensors at the fixed locations about one or more second vehicles;

determining visibility information comprising a first visibility value for at least a first portion of a first image and a second visibility value for at least a second portion of the first image, wherein the first image is input into a machine learning model corresponding to an image sensor that generated the first image and a forward pass through the machine learning model is computed, and wherein the machine learning model is trained to assign individual visibility values indicative of a degree of visibility loss associated with individual portions of the first images; and providing a control signal to cause adjustment of operation of at least one subsystem of the vehicle to adjust a speed of the vehicle based on the visibility information comprising the first visibility value and the second visibility value.

2. The method of claim 1, wherein the machine learning model is a convolutional neural network and/or a transformer network.

3. The method of claim 1, wherein the visibility information reflects one or more scene tags indicative of labels associated with loss of visibility.

4. The method of claim 3, further comprising:

updating a user interface presented via a display of the vehicle to indicate a particular scene tag and a textual description of the adjustment.

5. The method of claim 3, wherein the scene tags comprise haze, rain, smoke, or fog.

6. The method of claim 1, wherein causing adjustment of operation comprises reducing the speed associated with an autonomous driving mode.

7. The method of claim 1, wherein the first visibility value indicates a first severity associated with a reduction in visibility for first portions of the first images and a second visibility value indicates a second severity associated with a reduction in visibility for second portions of the first images, and wherein the first visibility value and the second visibility value are selected, by the machine learning model, from a range of values.

8. The method of claim 7, wherein each image is separated into a plurality of portions each representing a rectangular pixel area.

9. A system comprising one or more processors and non-transitory computer storage media including instructions that when executed by the processors cause the processors to perform operations, wherein the system is included in a vehicle, and wherein the operations comprise:

obtaining first images from first image sensors positioned at fixed locations about the vehicle, the first image sensors corresponding to machine learning models that are trained using second images obtained from second image sensors at the fixed locations about one or more second vehicles;

determining visibility information comprising a first visibility value for at least a first portion of a first image and a second visibility value for at least a second portion of the first image, wherein the first image is input into a machine learning model corresponding to an image sensor that generated the first image and a forward pass through the machine learning model is computed, and wherein the machine learning model is trained to assign individual visibility values indicative of a degree of visibility loss associated with individual portions of first images; and providing a control signal to cause adjustment of operation of at least one subsystem of the vehicle to adjust a speed of the vehicle based on the visibility information comprising the first visibility value and the second visibility value.

10. The system of claim 9, wherein the machine learning model is a convolutional neural network and/or a transformer network.

11. The system of claim 9, wherein the visibility information reflects one or more scene tags indicative of labels associated with loss of visibility.

12. The system of claim 11, wherein the operations further comprise:

updating a user interface presented via a display of the vehicle to indicate a particular scene tag and a textual description of the adjustment.

13. The system of claim 11, wherein the scene tags comprise haze, rain, smoke, or fog.

14. The system of claim 9, wherein causing adjustment of operation comprises reducing the speed associated with an autonomous driving mode.

15. The system of claim 9, wherein the first visibility value indicates a first severity associated with a reduction in visibility for the first portions of the first images and a second visibility value indicates a second severity associated with a reduction in visibility for second portions of the first images, and wherein the first visibility value and the second visibility value are selected, by the machine learning model, from a range of values.

16. The system of claim 15, wherein each image is separated into a plurality of portions each representing a rectangular pixel area.

17. A non-transitory computer storage media storing instructions that when executed by a system of one or more processors, cause the one or more processors to perform operations, wherein the system is included in a vehicle, and wherein the operations comprise:

obtaining first images from first image sensors positioned at fixed locations about the vehicle, the first image sensors corresponding to machine learning models that are trained using second images obtained from second image sensors at the fixed locations about one or more second vehicles;

determining visibility information comprising a first visibility value for at least a first portion of a first image and a second visibility value for at least a second portion of the first image, wherein the first image is input into a machine learning model and a forward pass through the machine learning model corresponding to an image sensor that generated the first image is computed, and wherein the machine learning model is trained to assign individual visibility values indicative of a degree of visibility loss associated with individual portions of first images; and providing a control signal to cause adjustment of operation of at least one component of the vehicle to adjust a speed of the vehicle based on the visibility information comprising the first visibility value and the second visibility value.

18. The computer storage media of claim 17, wherein the visibility information reflects one or more scene tags indicative of labels associated with loss of visibility, wherein causing adjustment of operation comprises updating a user interface presented via a display of the vehicle, and wherein the updated user interface indicates a particular scene tag and a textual description of the adjustment.

19. The computer storage media of claim 17, wherein causing adjustment of operation comprises reducing a speed associated with an autonomous driving mode.

* * * * *